United States Patent [19]

Rhodes et al.

[11] Patent Number: 5,359,468
[45] Date of Patent: Oct. 25, 1994

[54] DIGITAL DATA STORAGE TAPE FORMATTER

[75] Inventors: Edward J. Rhodes; Daryl K. Adams, both of San Jose; Clifford R. Berry, Fremont; Ta-Lin Chang, Cupertino; David R. Lee, San Jose, all of Calif.

[73] Assignee: R-Byte, Inc., San Jose, Calif.

[21] Appl. No.: 740,755

[22] Filed: Aug. 6, 1991

[51] Int. Cl.$^5$ .............................. G11B 5/09
[52] U.S. Cl. .......................... 360/48; 360/32; 360/53; 360/78.07; 360/78.15
[58] Field of Search .............. 360/48, 32, 46, 53, 360/64, 78.07, 78.15

[56] References Cited

U.S. PATENT DOCUMENTS

| | | |
|---|---|---|
| 3,838,453 | 9/1974 | Buslik et al. . |
| 3,860,960 | 1/1975 | Akamine . |
| 3,883,785 | 5/1975 | Fulcher et al. . |
| 4,060,840 | 11/1977 | Umeda . |
| 4,258,399 | 3/1981 | Iijima et al. . |
| 4,408,235 | 10/1983 | Ito . |
| 4,410,919 | 10/1983 | Umeda . |
| 4,459,625 | 7/1984 | Kawase . |
| 4,510,534 | 4/1985 | Maeda . |
| 4,541,024 | 9/1985 | Seiben . |
| 4,599,561 | 7/1986 | Takahashi et al. . |
| 4,740,850 | 4/1988 | Ogata . |
| 4,742,407 | 5/1988 | Smith et al. . |
| 4,758,398 | 7/1988 | Nishida et al. . |
| 4,800,450 | 1/1989 | Rodal et al. . |
| 4,833,549 | 5/1989 | Yoshimoto et al. . |
| 4,835,629 | 5/1989 | Ueno et al. . |
| 4,873,589 | 10/1989 | Inazawa et al. . |
| 4,891,644 | 1/1990 | Noro . |
| 4,899,233 | 2/1990 | Yoshida . |
| 4,910,448 | 3/1990 | Tomisawa et al. . |
| 4,939,595 | 7/1990 | Yoshomoto et al. . |

OTHER PUBLICATIONS

"Flexible Magnetic Media for Digital Data Interchange", Secretariat: U.S.A. (ANSI), ISO/IEC JTC 1/SC 11 N 1026, 1990-07-13.

Primary Examiner—Robert J. Pascal
Assistant Examiner—Haissa Philogene
Attorney, Agent, or Firm—Lyon & Lyon

[57] ABSTRACT

In a digital data storage audio tape system having a host device interface unit, a main data buffer manager, a main data buffer, a processor, a data separator, a tape drive unit, and a read/write channel, this invention comprises a formatter providing track construction, encoding and decoding, error correction, and direct memory access of digital data transmitted between the host device unit and the tape drive unit and a frame buffer for buffering digital data for encoding and decoding, and error correction. The formatter is coupled between the main data buffer manager, via a direct memory access channel, and the read/write channel of the tape drive, and further is coupled to the frame buffer. The formatter is coupled to and responsive to instruction control by the processor in conjunction with instruction control of the tape drive unit by the processor.

38 Claims, 13 Drawing Sheets

Microfiche Appendix Included
(16 Microfiche, 93/2 Pages)

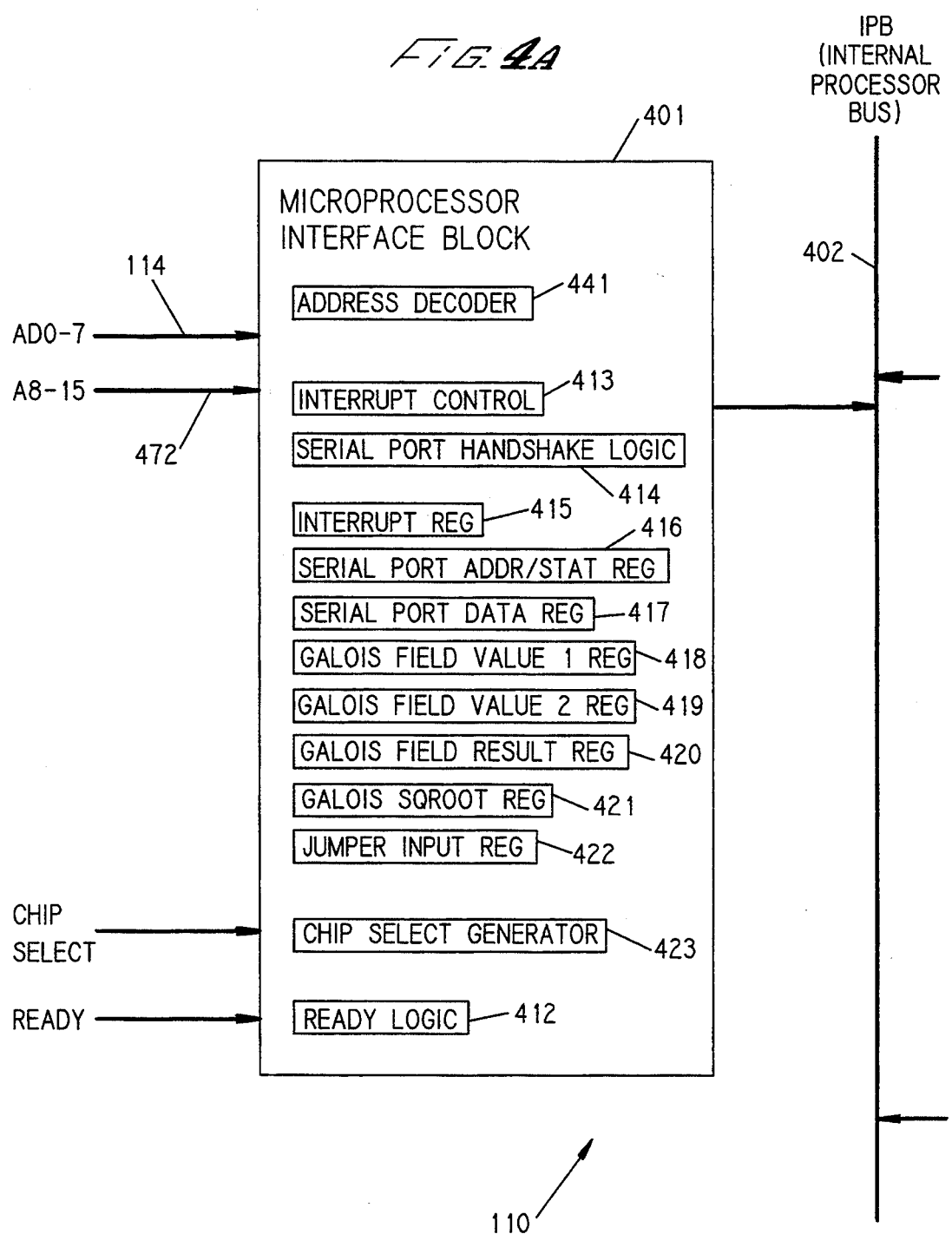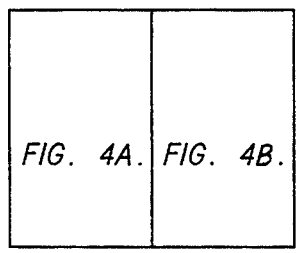

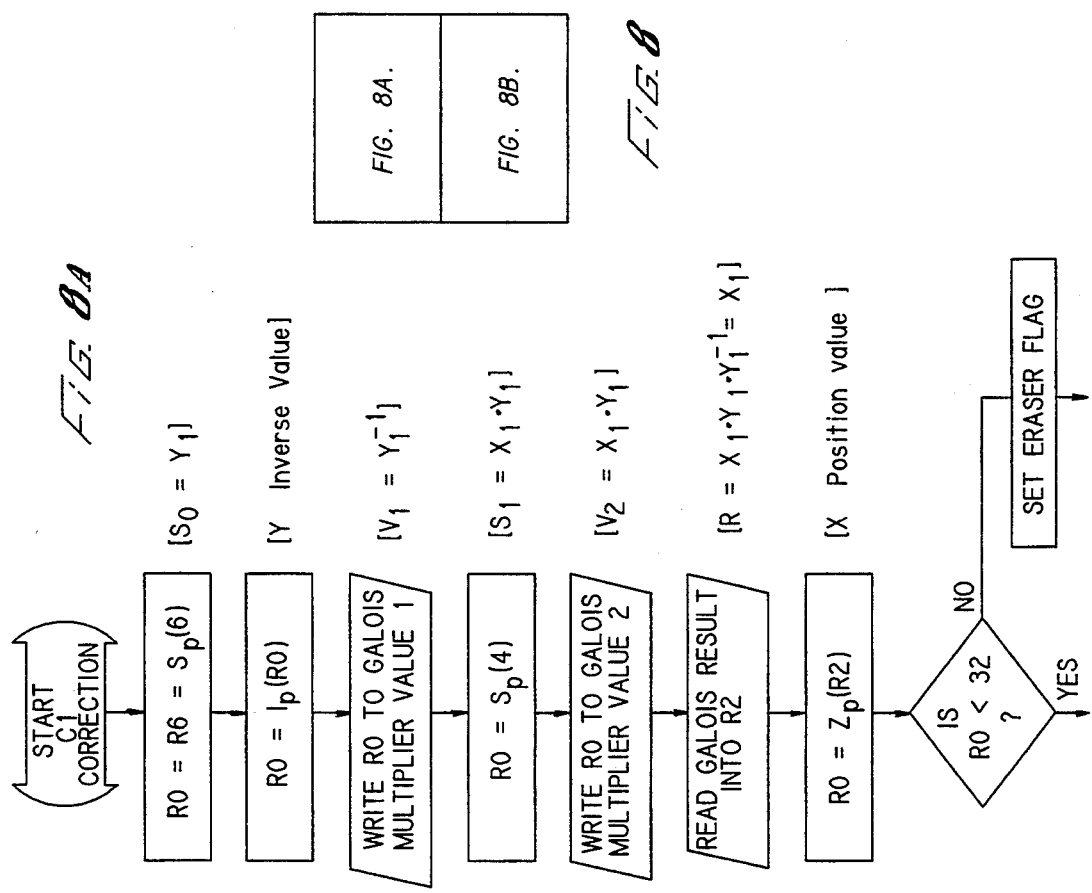

DIGITAL DATA STORAGE TAPE FORMATTER

Reference is made to a microfiche appendix A comprising ninety-one frames of electronic schematic drawings including gate logic diagrams showing an embodiment of this invention for the facilitation of understanding the invention.

FIELD OF THE INVENTION

The present invention relates generally to the field of digital data storage in audio tape and more particularly to an efficient formatting apparatus and method for high-performance tape systems.

BACKGROUND OF THE INVENTION

The mechanism of coding on magnetic tape is by a formatter device which codes and writes bits represented by magnetic flux reversals on a ferromagnetic tape medium. There are many different types of coding used in the prior art, varying according to polarities (return to zero or not during a transition), bit train compression, and clocking capability. The most common coding schemes for high-performance tapes are non-return-to-zero-inverted (NRZI), phase encoding (PE), and group coded recording (GCR) which is a combination of NRZI and PE. A code is self-clocking if a signal pulse is generated for every stored bit.

Characters are recorded on tape by tracks with each character stored in a column across the tape with embedded parity bits for error checking. Typically, each track has one write head and usually one read head. To further limit errors, information written on tape is often read immediately after being written (so-called read-after-write or RAW) by a separate read head mounted closely to the write head. On a typical tape there is a stored addressing information (SAI) section for locating a record and a data section which may also provide additional addressing information. The SAI typically includes (in sequence) a postamble immediately adjacent the previous data record, an interrecord gap (IRG) providing a space interval for tape motion changes, beginning and end of tape characters, various other markers, clocking and deskewing information, and a preamble immediately adjacent the next data record. The preamble utilizes sync marks to synchronize detection circuits for distinguishing bits. The postamble signals the end of a data record or block. To save space and access time, IRGs may be placed between blocks (IBGs) rather than records and related blocks may be grouped into a file and designated by an end of file marker. "Load point" and an "end of reel" markers indicate the beginning and end of the tape respectively and are typically reflective for detection by a photocell in the tape drive unit.

A standard format for digital data storage (DDS) using 3.81 mm digital audio tape (DAT) magnetic tape is set forth by the European Computer Manufacturers Association in the document "Flexible Magnetic Media for Digital Data Interchange" (ISO/IEC JTC 1/SC 11N 1026, hereinafter "DDS standard", 1990-07-13).

Briefly, DDS format data has two types of separator marks indicating logical separations of the data. Separator 1 is a "file mark" and separator 2 is a "set mark". User data, separator marks, and associated information are formed into groups occupying groups of tracks in a "main zone" of the track. Additional information about the contents of the group, the location of the tracks and the contents of the tracks is recorded in two parts of each track called "sub zones". The two sub zones constitute the "subdata" area of the track. In addition, there are margin zones at the extreme ends of the tape and Automatic Track Finding (ATF) zones between the sub zones and the main zone. Each zone in a track is further segmented into blocks called margin blocks (in the margin zone), preamble, subdata, and postamble blocks (in the sub zones), spacer and ATF blocks (in the ATF zone), and preamble and main data blocks (in the main zone). A "frame" is a pair of adjacent tracks with azimuths of opposite polarity (where the azimuth is the angle between the means flux transition line with a line normal to the centerline of the track). Data to be recorded is grouped into "basic groups" of 126632 bytes. Each basic group is identified by a running number from 1 to 126632. Data and separator marks are grouped into the basic groups starting with basic group no. 1. Error Correction Codes (ECC) are termed C1, C2, and C3 which are computed bytes determined from the data using Read-Solomon error correction techniques (see below for details). C3 is capable of correcting any two tracks which are bad.

Write data channel functions, including coding and error correction code, are typically performed by a controller operating through a write amplifier positioned near the write head. The write amplifier drives the write current through the write head.

Read data channel functions, including amplification and equalization of the read signals and data retrieval, are typically performed by automatic track-oriented gain-adjustment by a read amplifier and timing, deskewing, decoding, error detection and correction by a controller. The fundamental function of readback is to accurately convert the amplified read signal waveform into its binary equivalent. During writing, an external clock (oscillator) spaces recorded bits. An accurate readback therefore must be synchronous, and a code which inherently strobes the readback signal is desirable, such as self-clocking pulse generation in PE and GCR. One special type of GCR coding is 8-10 GCR which, briefly, is a coding scheme mapping each 8 bit group of data into a 10 bit code group. When the resulting 10 bit code groups are concatenated in any sequence, the resulting bit stream has the characteristic that there are never more than 3 0's in a row.

Prior art formatter systems for DDS/DAT typically require 96 to 192K bytes of static random access memory (SRAM). DDS type drives operate at 9.408 million code bits per second. In prior art read-after-write (RAW) systems, rewriting a bad frame after RAW-checking typically requires 2 to 5 intervening frames which wastes that amount of tape capacity per bad frame. Prior art systems were unreliable primarily because of multiple components and complex electronic interconnections. This resulted in relatively physically large formatter systems and high costs.

There is therefore a need for a smaller, less expensive formatter having fewer components, but achieving greater reliability and more efficient performance in terms of speed and capacity.

SUMMARY OF THE INVENTION

Accordingly, in order to advance the magnetic digital data storage art, the present invention has the following objects:

It is a principal object of the present invention to provide an improved formatter for digital data storage.

It is another object of the present invention to provide a formatter having fewer components and reduced electronic complexity, while achieving greater reliability and more efficient performance.

It is a further object of the present invention to achieve all of the formatter functions on a compact single chip.

It is still a further object of the present invention to provide more efficient tape usage and thereby increase tape capacity.

It is yet a further object of the present invention to reduce the formatter static random access memory requirement.

It is another object of the present invention to increase the speed of magnetic tape digital data storage read and write operations.

It is still another object of the present invention to improve the reliability of magnetic tape digital data storage read and write operations.

To achieve these and other objects, the present invention is contemplated to operate with a digital data storage audio tape system having a host device interface unit, a main data buffer manager, a main data buffer, a processor, a data separator, a tape drive unit, and a read/write channel. This invention comprises a formatter providing track construction, encoding and decoding, error correction, and direct memory access of digital data transmitted between the host device unit and the tape drive unit and a frame buffer for buffering digital data for encoding and decoding, and error correction. The formatter is coupled between the main data buffer manager, via a direct memory access channel, and the read/write channel of the tape drive, and further is coupled to the frame buffer. The formatter is coupled to and responsive to instruction control by the processor in conjunction with instruction control of the tape drive unit by the processor.

The method of this invention is for accessing and encoding and decoding the data on a per frame and per track basis, comprising the operational steps of interleaving, randomizing, C1/C2 ECC generation, subdata block processing, sync generation, automatic track finding signal generation, deinterleaving, derandomizing, C1/C22 ECC, syndrome generation, and subdata block capture.

This invention provides a significant overall reduction in parts count, costs, and electronic complexity, and subsequent increased reliability over the prior art. A reduction in RAM requirements is realized while still performing (1) buffering two or three frames of data during tape read operations, (2) buffering three frames of write data during write operations, (3) storing subdata information for each frame, (4) storing ID information for each frame, (5) storing ECC information such as parity symbols, syndromes, bad block pointers, and the like, and (6) providing storage for microcontroller scratch memory for storage of variables, pointers, data stack, and the like. In the preferred embodiment, the above operations are achieved by a frame buffer of 32 Kbytes, which is one-third to one-sixth the RAM required in prior art formatter systems. Data transfer rates are higher than the standard DAT of 9.408 million code bits per second. This is achieved by an independent oscillator allowing bit rates of 12 million code bits per second. A parallel-functioning randomizer/derandomizer is utilized that is eight times faster (for 8-bit systems) than the prior art. Tracks with missing sync marks at the beginning of its main data field may still be read with only simple C2 error correction. In RAW operation, a bad frame is re-written with only one intervening frame as contrasted with prior art systems requiring two to five intervening frames which wasted tape space. An independent track checksum unit acts on RAW data which allows more stringent RAW criteria resulting in higher data integrity. The invention also provides ATE testability and diagnostic loopback capability.

A further understanding of the nature and advantages of the present invention may be realized by reference to the Detailed Description of the Invention and the attached drawings.

DETAILED DESCRIPTION OF THE INVENTION

Figure 1:
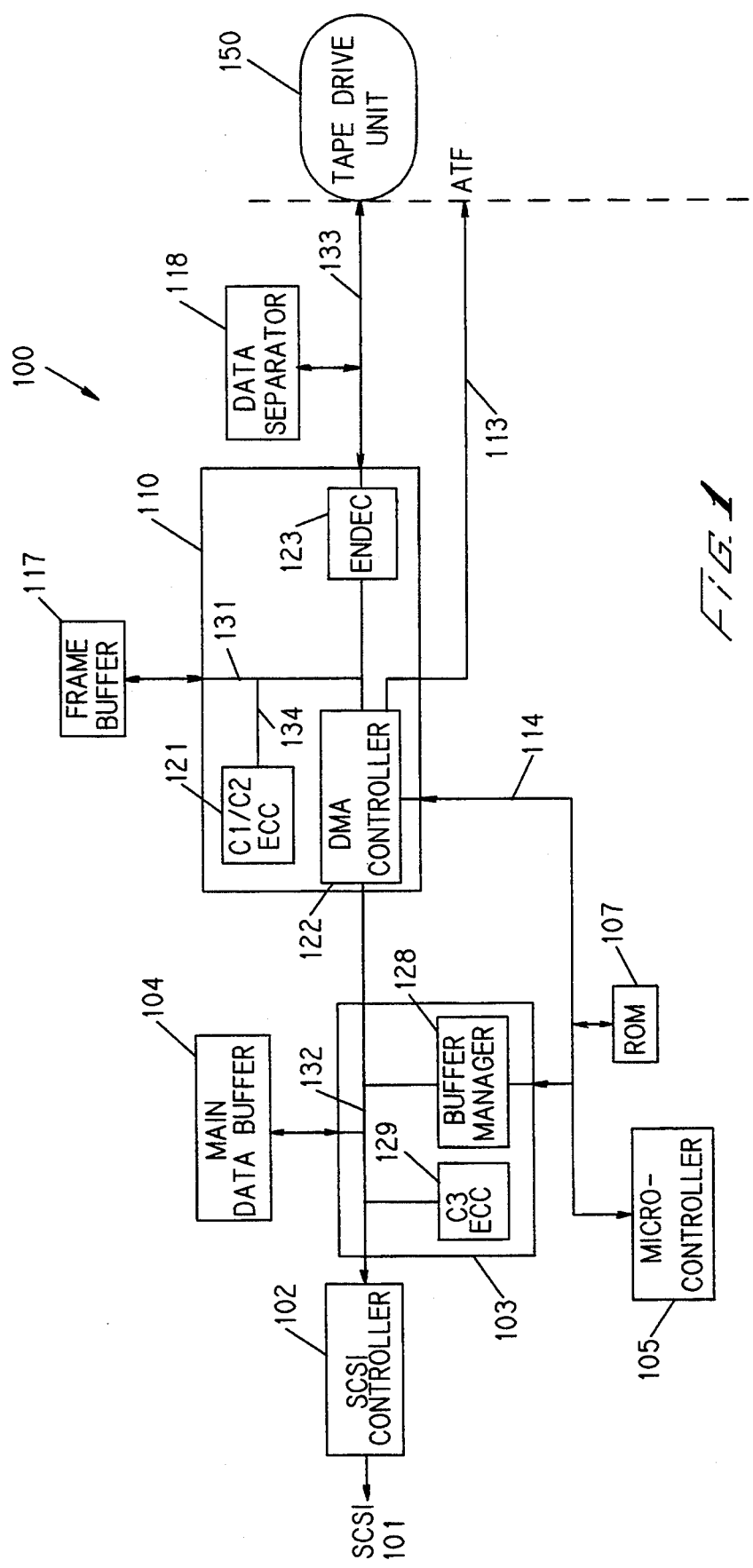
FIG. 1 is a schematic block diagram of a digital data tape storage system including a system according to the present invention.

FIG. 1 is a schematic block diagram of a magnetic tape digital data storage system 100 according to the present invention. System 100 in this embodiment includes an interface unit 102, a buffer manager 103, a data main buffer 104, a microcontroller 105, a formatter 110, a data separator 118, a frame buffer 117, a high-speed serial expansion bus 113, and other data buses 114, 131, and 132. Formatter 110 includes a C1/C2 error correction code (ECC) unit 121, a direct memory access (DMA) controller 122, and an encode/decode (ENDEC) unit 123. In the preferred embodiment, formatter 110 is implemented in a single chip and frame buffer 117 is a single chip static random access memory (SRAM) unit. C1/C2 ECC unit 121, DMA controller 122, and ENDEC 123 are coupled to each other and to RAM frame buffer 117 via high-speed parallel bus 131. ENDEC 123 is coupled to bus 133.

Interface unit 102 is for communication with a host computer 101 (not shown), and is coupled to buffer manager 103 which in turn is coupled to main data buffer 104 and to microcontroller 105 via bus 132.

Buffer manager 103 includes a C3 ECC unit 129 and a buffer manager sub unit 128. Both are coupled to bus 132 which couples interface 102 to DMA controller 122 and main buffer 104.

ENDEC 123 serially interfaces an analog read/write channel 133 which is coupled to a tape drive unit 150. Main buffer 104 and buffer manager 103 are parallel-interfaced through bus 132 to DMA controller 122. Frame buffer 117 is parallel-interfaced through Internal data path bus 131. DMA controller 122 is linked to main data buffer 104 via bus 132 and to frame buffer 117 via bus 131. Microcontroller 105 is interfaced directly to internal registers (not shown) in formatter 110 and there is arbitrated access from microcontroller 105 to frame buffer 117. A serial to parallel path from read and write channels 133 to frame buffer 117 travels through ENDEC 123. A high-speed parallel bus 134 couples frame buffer 117 to C1/C2 ECC unit 121. For diagnostic convenience, all data paths include loop back capability.

In operation, broadly, formatter 110 is disposed between main data buffer 104 and write/read channel 133 of the tape drive. Bus 132, acting as a DMA channel, carries frames between main data buffer 104 and frame buffer 117. Formatter 110 formats user data on a per frame and per track basis, encodes/decodes and serializes/deserializes the data and SAI for read and write operations. User data is received from a host computer through interface 102 and buffer manager 103, and operations are performed under the control of microcontroller 105.

In a write operation, formatter 110 does read after write (RAW) checking, which in conjunction with microcontroller 105, determines whether a track was successfully written. If a frame fails to be properly written, microcontroller 105 immediately instructs formatter 110 to rewrite the failed frame by simply changing a buffer pointer and updating specific subdata areas. Triple buffering provided by frame buffer 117 allows microcontroller 105 to keep a copy of the frame which is being RAW-checked in a buffer while simultaneously processing new frames for writing. The formatting operation includes interleaving/deinterleaving, randomizing/derandomizing, C1/C2 ECC generation, subdata block processing, sync generation, and automatic track finding (ATF) signal generation. Formatter 110, through DMA controller 122, interfaces multiplexed address/data bus 114 to communicate with microcontroller 105. The registers in formatter 110 are mapped to the memory of microcontroller 105. Microcontroller 105 can access all of frame buffer 117 in the data space of microcontroller 105's address space. Formatter 110 also includes system support logic (such as decoding microcontroller's address space, generation of chip selects and wait states) for microcontroller 105, buffer manager 103, interface 102, and a data compression chip (if desired).

The function of DMA controller 122 is to move data between buffer manager 103 and frame buffer 117. In the preferred embodiment, DMA controller 122 is programmable. Frame buffer 117 is divided into four logical buffers (of 8K bytes each, in the preferred embodiment). Three of the logical buffers are used for buffering read and write data. During a read as part of a RAW cycle, data is not stored in any buffer. This is because C1 ECC syndromes are calculated and non-zero syndromes are stored in a dedicated area of frame buffer 117. Track checksums are also computed and are stored in registers in formatter 110. The stored syndrome and checksum information is sufficient for checking the correctness of the written data, so the actual data being read back is discarded. The fourth buffer is used as storage area for microcontroller 105 and formatter 110. Microcontroller 105 accesses frame buffer 117 through a window register on formatter 110.

Figure 2:
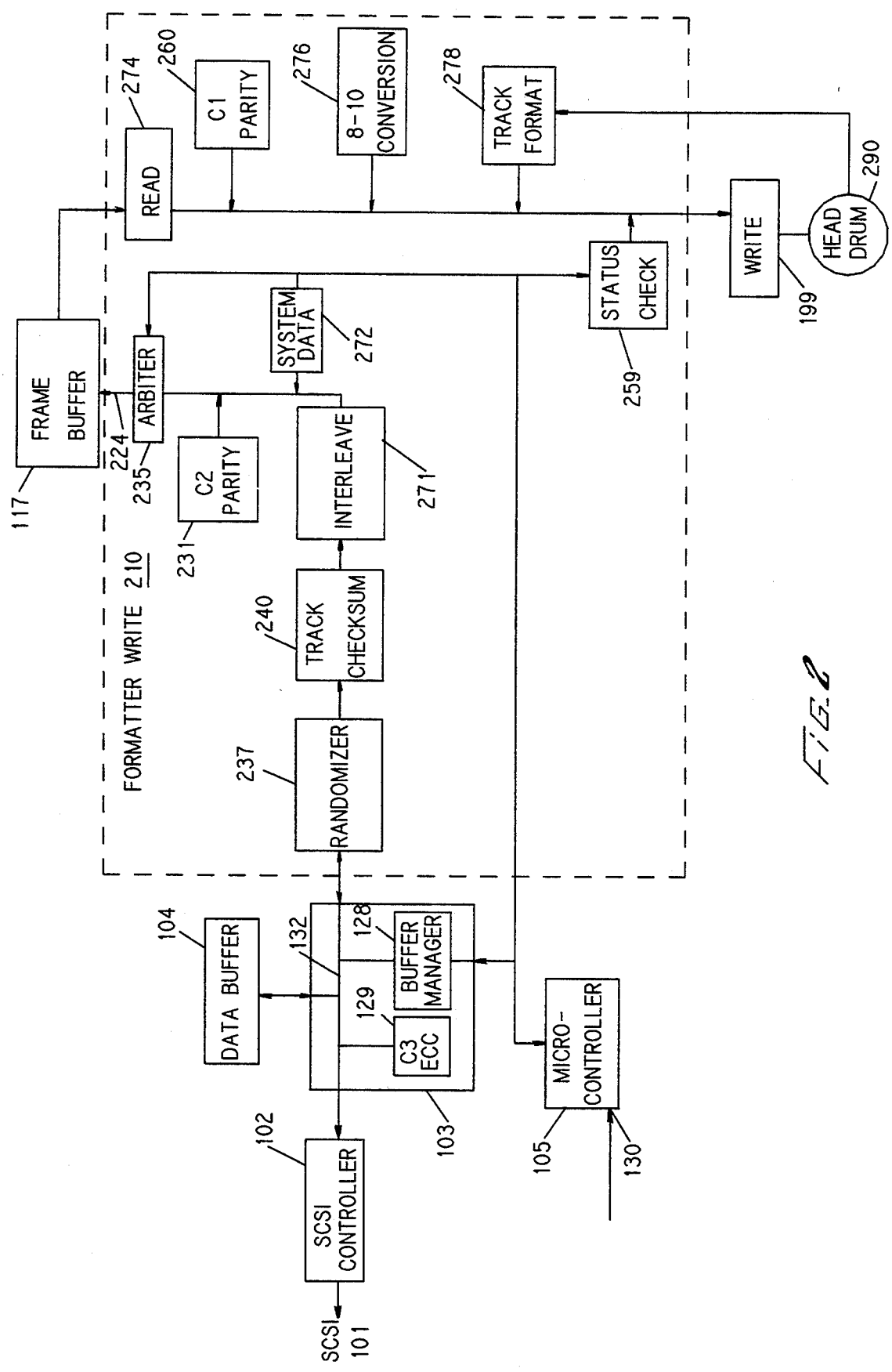
FIG. 2 is a block diagram of a simplified write operation according to one embodiment of the present invention.

FIG. 2 is a block diagram of a simplified write operation according to one embodiment of the invention. User data flows from a host computer at 101 to tape at 199 in communication with a head drum 290 first through interface 102 and buffer manager 103 to main data buffer 104. Data is assembled in main data buffer 104 until there is one group of data, organized as 22 frames. Microcontroller 105 then generates specific system data (such as group number, filemark, save set marks, C3 ECC frame, etc.) for the data group in main data buffer 104. Next, the data group is moved under the control of microcontroller 105 to frame buffer 117 (which in the preferred embodiment is 32K×8 SRAM). Microcontroller 105 then initializes DMA controller 122 in formatter 110 and BFR MGR 128 in buffer manager 103 (all shown in FIG. 1) to move one frame of data. Returning to FIG. 2, data now begins to move from main data buffer 104 to a write formatter 210. As each byte is transferred from buffer manager 103 to formatter 210, the following operations are performed on the fly before that data is written to frame buffer 117: (1) data is randomized (compatible with the DDS standard, in the preferred embodiment) by randomizer 237, a running track checksum of transferred bytes is computed by track checksum 240 and (3) data is interleaved (compatible with the DDS standard, in the preferred embodiment) by interleave unit 271. In the preferred embodiment, randomizer 237 is parallel-functional as opposed to prior art systems which are serial-functional. The present invention is therefore eight times faster than prior art formatters for 8-bit systems. Further, randomization and interleaving is performed on the fly. Microcontroller 105 next moves system area data 272 for the single frame to frame buffer 117. Formatter 210 then computes C2 parity bytes using C2 parity generator 231 and writes to frame buffer 117 on a frame basis. Formatter 210 then begins to read data at 274 from frame buffer 117 and, before outputting the serial data stream, performs the following operations: (1) C1 parity bytes are computed on the fly by C1 parity generator unit 260, (2) an 8-10 conversion is performed at 276, and (3) other track format data is generated at 278 (such as ATF signals, margins, IBG, preambles, subdata and the like compatible with the DDS standard) in synchronization with head drum 290 rotation. In the preferred embodiment, head drum 290 includes four read/write heads which rotation are synchronized with read/write operations. This is described in detail in System patent application Ser. No. 07/741,783 which is hereby incorporated by reference. At the end of frame, microcontroller 105 checks various status registers 259 to determine if a proper operation was completed on that frame. If proper, the next data frame is written from the beginning of the generation of system area data. Arbiter 235, coupled to frame buffer 117 by write frame buffer bus 224, manages and interleaves access to frame buffer 117. In the preferred embodiment, 8-10 GCR encoding and decoding are utilized.

Figure 3:
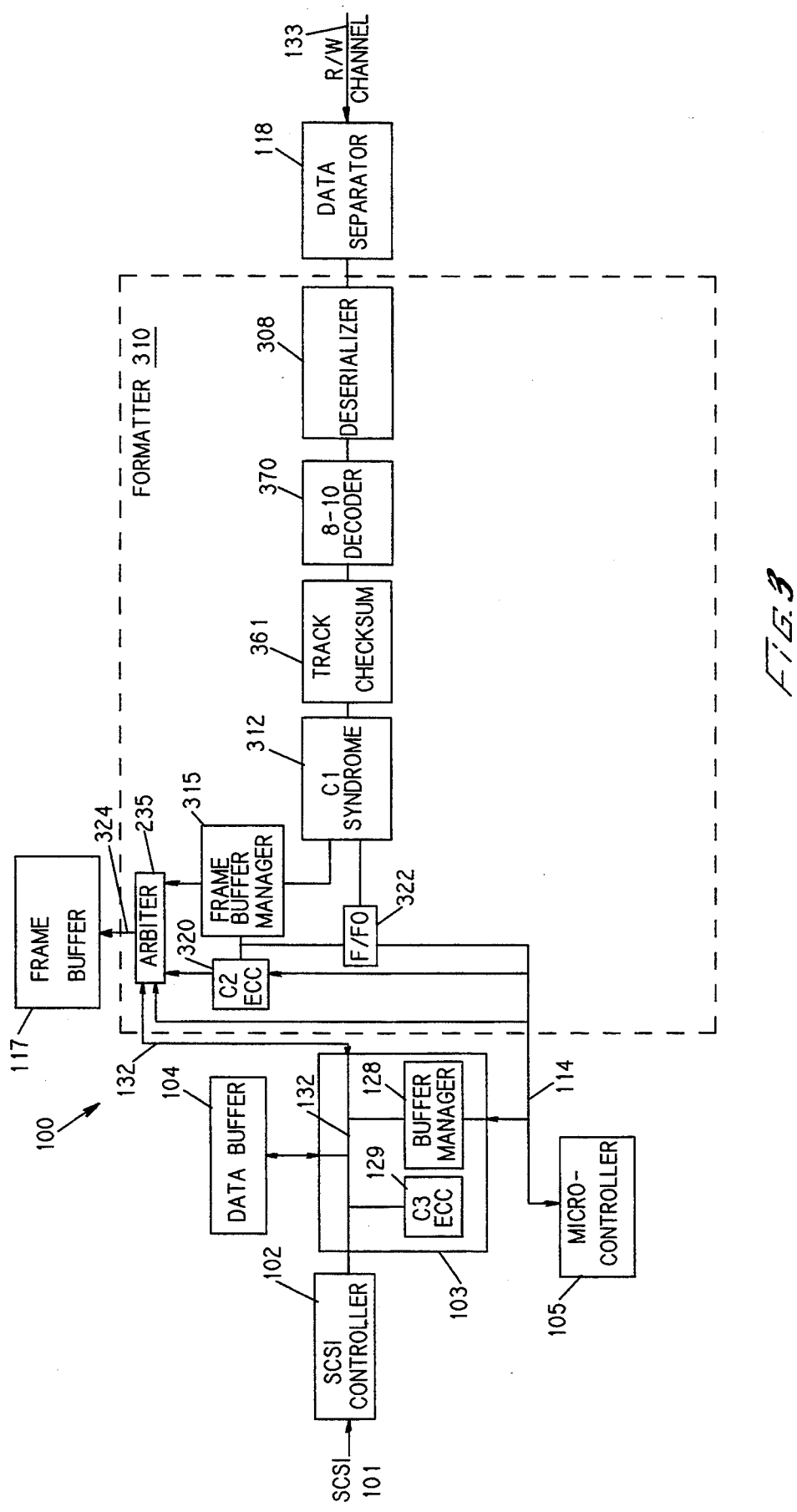
FIG. 3 is a block diagram of a simplified read operation according to the present invention.

FIG. 3 is a block diagram of a simplified read operation according to the invention. R/W channel 133 transmits read data to data separator 118 which transmits synchronized serial data and clock pulses to a read formatter 310. A deserializer 308 converts the serial data to parallel, an 8–10 decoder 370 decodes the data, a track checksum unit 361 performs independent track checksum, a C1 syndrome generator 312 computes C1 syndromes on the fly and writes both the data and syndromes into frame buffer 117 after buffer management by a frame buffer manager 315. If all C1 syndromes are zero, there are no read errors in the track. When a non-zero syndrome is detected, the block location is stored into a specific area in frame buffer 117 for quick microcontroller 105 access. It should be noted that error correcting software for microcontroller 105 may be invoked at this point to correct errors indicated by non-zero syndromes. After C1 correction is completed, microcontroller 105 enables C2 ECC unit 320 to generate C2 syndromes for the frame. Each time a non-zero syndrome is generated, C2 ECC unit 320 pauses so that programmed control in microcontroller 105 can perform error correction for that C2 block. Note that the power of the C2 error correction is increased if the C1 control passes so-called "erasure pointers" to the C2 control. Erasure pointers are indicators that certain errors were not correctable by the C1 control, but the locations of such errors are known to the C2 control from this information. In a similar manner, if a track is known to have errors which are detected but are not correctable by C2 control, these tracks are marked as erasure pointers for the C3 error correction control. Once a frame of data is assembled into frame buffer 117, and all C1 and C2 errors corrected, the data is moved into main data buffer 104 via bus 132. From there, the data is moved to interface 102 for communication with the host computer. Arbiter 235, coupled to frame buffer 117 by a read frame buffer bus 324, manages and interleaves access to frame buffer 117. In the invention, C1 parity and syndromes are generated on the fly as data is moved to and from the tape, for main data as well as subdata.

Figure 4B:
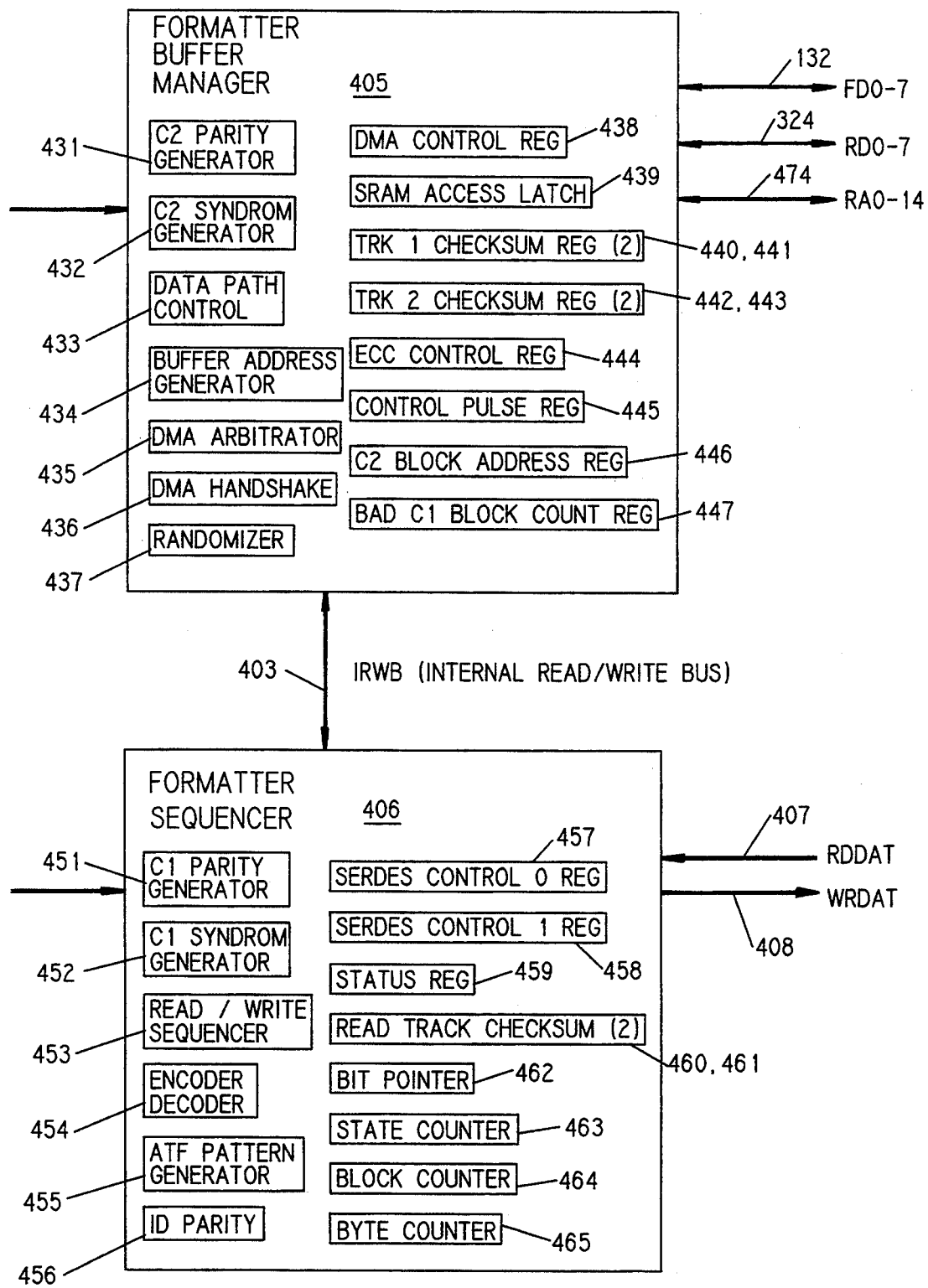
FIG. 4 is an organizational and functional block diagram of the preferred embodiment of a formatter according to the present invention.

FIG. 4 is an organizational and functional block diagram of the preferred embodiment of formatter 110. A microprocessor interface 401 interfaces microcontroller 105 (of FIG. 1) via multiplexed address/data bus 114 and a high-order microcontroller address lines 472. An internal processor bus 402 couples a formatter buffer manager (FBM) 405 and a formatter-sequencer 406 to interface 401. An internal read/write bus (IRWB) 403 couples FBM 405 and formatter-sequencer 406. FBM 405 is coupled to DMA channel bus 132, read frame buffer bus 324 and to address lines 474 for frame buffer 117 (of FIG. 3). Formatter-sequencer 406 is coupled to read/write channel 133 by buses RDDAT 407 and WRDAT 408. A detailed description of system signals in formatter 110 is provided below.

Functions are organized in the block components as follows. Microprocessor interface block 401 includes an address map decoder 411, ready logic 412, interrupt control 413, serial port handshake logic 414, and the following registers: interrupt 415, serial port addr/stat 416, serial port data 417, Galois field value 1 418, Galois field value 2 419, Galois field result 420, Galois square root 421, jumper input 422, and chip select generator 423.

FBM 405 includes a C2 parity generator 431, a C2 syndrome generator 432, a data path control 433, a buffer address generator 434, a direct memory access (DMA) arbitrator 435, a DMA handshake 436, and a randomizer 437, and the following registers: DMA controller control 438, SRAM access latch 439, track 1 checksum (2) 440, 441, track 2 checksum 442, 443, ECC control 444, control pulse 445, C2 block address 446, and bad C1 block count 447.

Formatter-sequencer 406 includes a C1 parity generator 451, a C1 syndrome generator 452, a read/write sequencer 453, an encoder/decoder 454, an automatic track follower (ATF) pattern generator 455, and an ID parity 456, and the following registers: serial/deserializer (serdes) control 0 457, serdes control 1 458, status 459, two read track checksum units (2) 460, 461, and a bit pointer 462, a state counter 463, a block counter 464, and a byte counter 465.

In the preferred embodiment, formatter 110 also includes specific "glue" logic to integrate other system functions. These include microcontroller address map decoder 411, ready logic 412, interrupts 413, serial port handshake logic 414, microcontroller address/data bus demultiplexing, serial communication channel to an AFT, full support for microcontroller-based diagnostics, tri-state and activity modes to support ATE testing and the like. In particular, address map decoder 411, chip select generator 423 and ready line/wait state logic 412 as system functions reduce parts count, cost, and electronic complexity.

Interface block 401 performs address decoding at 411, wait state generation at ready logic 412, and interrupt control at 413.

Read-after-write (RAW), with re-write of bad blocks, is implemented to be compatible with the DDS standard. A frame is re-written using the following procedure. C1 ECC is checked on the main data area of each frame. The frame is rewritten if any block in the main data area of the frame has a C1 syndrome indicating two or more symbols in error. Also, the frame is re-written if more than N blocks in the main data area of either track of the frame have syndromes indicating single symbol errors. (N is between 1 and 14, and preferably 3.) This guards against potentially unreadable data areas. Next, C1 ECC is checked on the subdata areas of each frame. The frame is re-written if more than M blocks in the subdata area of either track of the frame have syndromes indicating any type of error. (M is between 1 and 8, and preferably 2.)

According to the present invention, under RAW operation, a bad frame may be re-written with only one intervening frame as contrasted with prior art systems requiring two to five intervening frames which wasted tape space. The frame is re-written if more than 14 blocks in any area of either track of the frame have C1 syndromes indicating any type of error. Read track checksum 461 calculates DDS track checksums as data is transferred from the read channel to frame buffer 117. The frame is re-written if any discrepancy is found in the track checksums. The track checksums are re-computed during the main data area read (and error-corrected if necessary), and compared against the stored value that was written for that track. The checksum is also compared to the value read back from one good sub data block pair. This guards against drop-ins in the main data area of the frame. The independent track checksum unit 361 (FIG. 3) or 461 (FIG. 4) acts on RAW data which allows more stringent RAW criteria resulting in higher data integrity.

In more detail, read after write (RAW) is user selectable. When RAW is selected, only group data frames will be checked for read errors. Amble frames are not checked for read errors. For RAW, a track's worth of data is checked for errors. First, the number of C1 errors over the main data is checked. The error checking is done by comparing the track checksum of the track read with the checksum of the track that was written. Also, the number of C1 ECC errors are counted. The criteria used to decide if a frame needs to be re-written or not re-written, while doing single byte C1 corrections over the user data area, is the following: (1) greater than 32 C1 ECC errors on a track; (2) greater than 8 C1 ECC single errors on a track's user data blocks; (3) greater than 8 C1 ECC multiple errors on a track; (4) greater than 0 C1 ECC multiple errors on a track's user data blocks; and (5) track checksums are not equal even after C1 ECC checksum correction. These criteria are contained in microcontroller firmware which can be easily modified to satisfy different user requirements.

When a track has enough errors to enable a RAW re-write, a flag is set in memory signaling that there has been a RAW error. Before track A+ of each frame is to be written, the RAW flag is checked. If the flag is set, track A+ data is taken from the buffer that had the RAW error. Otherwise, the track A+ data is taken from the next buffer to be written. Until a frame has passed the RAW check, no other frames will be checked for RAW errors. If a frame fails the RAW check 127 times, a fatal error will have occurred and the R/W block 303 will stop writing data. For a detailed description of the command function environment implementing the RAW operation, see the System patent application Ser. No. 07/741,783.

Formatter 110 can write raw code bit patterns from main data buffer 104 and transmit them to write channel 133. This may be utilized for creating special test, diagnostic, and calibration tapes with formats that deliberately deviate from the DDS standard.

C1/C2 ECC

Error correcting code (ECC) is embodied in an algorithm producing check bytes used for the detection and correction of errors. A detailed description of ECC can be found in Peterson, W. W. and E. J. Weldon, Jr., *Error-Correcting Codes: Ed. II*, MIT Press (1972). The ECC utilized in an embodiment of the present invention is specified in the DDS standard and is briefly described following.

Encoder

The present invention employs two separate orthogonal ECCs known as C1 and C2 level ECC. The inner C1 (32, 28) Reed-Solomon (RS) code using $\alpha$ field elements has $$g_1(x) = (x + \alpha^0)(x + \alpha^1)(x + \alpha^2)(x + \alpha^3)$$
$$= x^4 + \alpha^{75}x^3 + \alpha^{249}x^2 + \alpha^{78}x + \alpha^6$$

The outer C2 (32, 26) RS code using $\alpha$ field elements has $$g_2(x) = (x + \alpha^0)(x + \alpha^1)(x + \alpha^2)(x + \alpha^3)(x + \alpha^4)(x + \alpha^5)$$
$$= x^6 + \alpha^{165}x^5 + \alpha^0x^4 + \alpha^{134}x^3 + \alpha^5x^2 + \alpha^{176}x + \alpha^{15}$$

Encoders to implement these codes are multi-stage linear feedback shift registers with connections corresponding to $g_i(x)$ and are known in the magnetic tape recording art.

Decoding and Correction

C1 coding produces four parity symbols for each 32 symbol block. It is capable of correcting 0, 1, or 2 errors in a block and detecting many errors of higher weight. Flags may be passed to the C2 error correction control logic giving location information for errors which are not corrected (or may have been misdetected) at the C1 level.

C2 coding produces six parity symbols for each 32 symbol block. It is capable of correcting up to six erasures (errors having known locations) or three errors in a block, or combinations of the same according to the following table.

| Number of Erasures | Number of Errors |
|---|---|
| 0 | 0,1,2,3 |
| 1 | 0,1,2 |
| 2 | 0,1,2 |
| 3 | 0,1 |
| 4 | 0,1 |
| 5 | 0 |
| 6 | 0 |

Further, many errors of higher weight also can be detected. Flags may be passed to the higher level control logic giving location information for errors which are not corrected (or may have been misdetected) at the C2 level. The higher level control logic may invoke further recovery processes, such as C3 level ECC correction or read re-tries.

In the present invention, the decoding of C1 and single erasure correction (error weight=0.5) in C2 is performed "on the fly". Higher-weight error patterns in C2 will require a tape stoppage for correction.

In the present invention, decoding and error correction are performed by a combination of hardware circuits in the formatter and software control logic in the microcontroller. Specifically, formatter 310 includes a C1 syndrome generator, a C2 syndrome generator, a GF($2^8$) Galois field multiplier, and a GF($2^8$) Galois field square root table. Other than the calculations performed by these circuits, all decoding and correction is done in microcontroller 105. A typical decoding computation performed by microcontroller 105 is:

(a) multiplication of two local operands (GF($2^8$) elements)
(b) addition (XOR) of a third element
(c) test for zero.

Since many such computations are involved in ECC decoding and correction, it will be appreciated that the Galois multiplier function in the formatter hardware provides considerable performance benefit.

In the present invention, microcontroller 105 performs a number of other functions in addition to error correction. See the System patent application Ser. No. 07/741,783 for detailed descriptions. Roughly speaking, only about 75% of the processor cycles will be available for ECC.

Decoding and error correction techniques utilizing syndrome information and Galois arithmetic are known in the magnetic tape recording art. In the present invention, such techniques are implemented in software control algorithms embodied in microcontroller 105.

Syndrome Calculation

Figure 6:
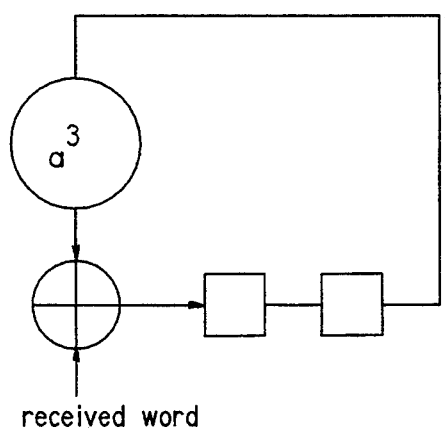
FIG. 6 shows a linear feedback shift register for calculating error correction code syndromes according to the present invention.

The code C1 is interleaved to degree 2. For this code, four syndrome calculators are needed. FIG. 6 shows a linear feedback shift register for calculating $S_3$. The other circuits for calculating $S_0$, $S_1$, and $S_2$ are similar.

Figure 5:
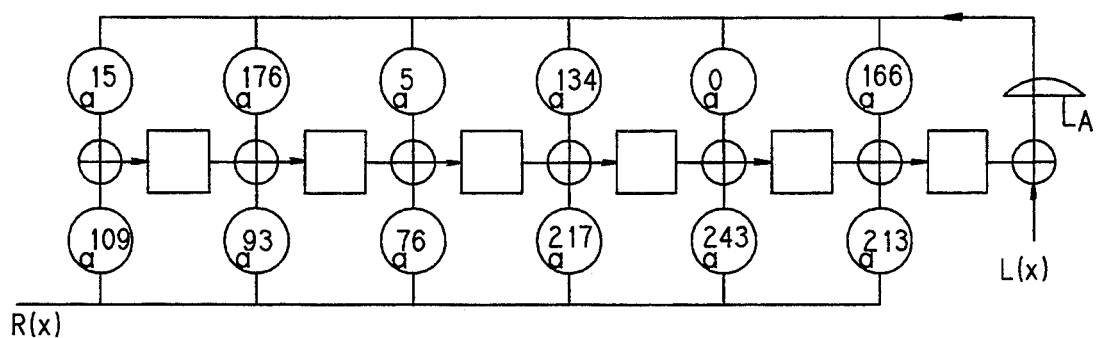
FIG. 5 is an exemplary linear feedback shift register circuit for an error correction encoder according to the present invention.

FIG. 5 shows an exemplary linear feedback shift register circuit for a C2 encoder. The code C2 is interleaved to degree 4 and has six parity checks. Thus circuits similar to that of FIG. 5 for computing $S_0$, $S_1$, $S_2$, $S_3$, $S_4$ and $S_5$ are utilized in this embodiment.

GF($2^8$) Array Multiplier

Figure 7:
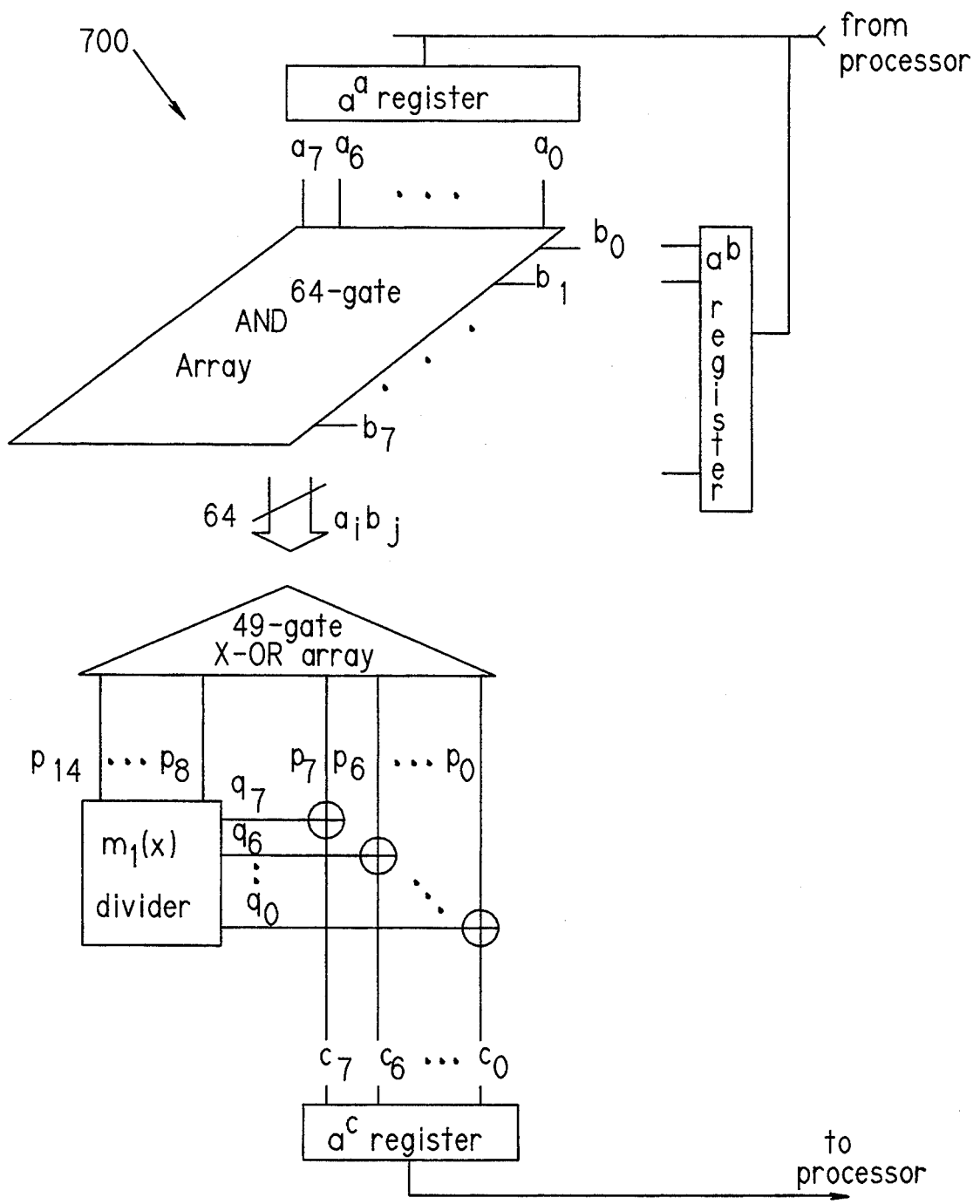
FIG. 7 shows the structure of an embodiment of an array multiplier for $GF(2^8)$ according to the present invention.

FIG. 7 shows the structure of an embodiment of an array multiplier. The inputs to circuit 700 are the field elements $$\alpha^a = a_7 x^7 + a_6 x^6 + \ldots + a_0$$

and $$\alpha^b = b_7 x^7 + b_6 x^6 + \ldots + b_0$$

The product of these polynomials has the form $$p(x) = p_{14} x^{14} + P_{13} x^{13} + \ldots + P_0$$

where $$P_k = \sum_{i=0}^{k} a_i b_{k-i}$$

In the field GF($2^8$), as generated by $$m_1(x) = x^8 + x^4 + x^3 + x^2 + 1,$$

the following relationships hold $$
\begin{aligned}
x^{14} &= \phantom{x^7 +} \phantom{x^6 +} + x^4 \phantom{+ x^3} \phantom{+ x^2} + x + 1 \\
x^{13} &= x^7 \phantom{+ x^6} \phantom{+ x^5} \phantom{+ x^4} \phantom{+ x^3} + x^2 + x + 1 \\
x^{12} &= x^7 + x^6 \phantom{+ x^5} \phantom{+ x^4} + x^3 + x^2 \phantom{+ x} + 1 \\
x^{11} &= x^7 + x^6 + x^5 + \phantom{x^4 +} + x^3 \\
x^{10} &= \phantom{x^7 +} x^6 + x^5 + x^4 \phantom{+ x^3} + x^2 \\
x^9 &= \phantom{x^7 + x^6 +} x^5 + x^4 + x^3 \phantom{+ x^2} + x \\
x^8 &= \phantom{x^7 + x^6 + x^5 +} x^4 + x^3 + x^2 \phantom{+ x} + 1
\end{aligned}
$$

Thus the coefficients of the final product $$\alpha^c = \alpha^{a+b} = c_7 x^7 + c_6 x^6 + \ldots c_0$$

can be calculated as follows:

$$
\begin{aligned}
C_7 &= P_{13} + P_{12} + P_{11} \phantom{+ P_{10} + P_9 + P_8} + P_7 \\
C_6 &= \phantom{P_{13} +} P_{12} + P_{11} + P_{10} \phantom{+ P_9 + P_8} + P_6 \\
C_5 &= \phantom{P_{13} + P_{12} +} P_{11} + P_{10} + P_9 \phantom{+ P_8} + P_5 \\
C_4 &= P_{14} \phantom{+ P_{13} + P_{12} + P_{11}} + P_{10} + P_9 + P_8 + P_4 \\
C_3 &= \phantom{P_{14} + P_{13} +} P_{12} + P_{11} \phantom{+ P_{10}} + P_9 + P_8 + P_3 \\
C_2 &= P_{13} + P_{12} \phantom{+ P_{11}} + P_{10} \phantom{+ P_9} + P_8 + P_2 \\
C_1 &= P_{14} + P_{13} \phantom{+ P_{12} + P_{11} + P_{10}} + P_9 \phantom{+ P_8} + P_1 \\
C_0 &= P_{14} + P_{13} + P_{12} \phantom{+ P_{11} + P_{10} + P_9} + P_8 + P_0
\end{aligned}
$$

Array multiplier 700 employs 64 2-input AND gates and 49+28 (=77) 2-input XOR gates Single erasure correction requires a total of six "computations", which the decoder must perform in one word time to correct one error in C1 and one erasure in C2 "on the fly". Since microcontroller 105 is capable of performing 12 computations per word-time, "on the fly" correction is easily achieved by the decoder. For details of C1 and C2 decoding and single erasure correction, see the Peterson book referenced above.

Figure 8B:
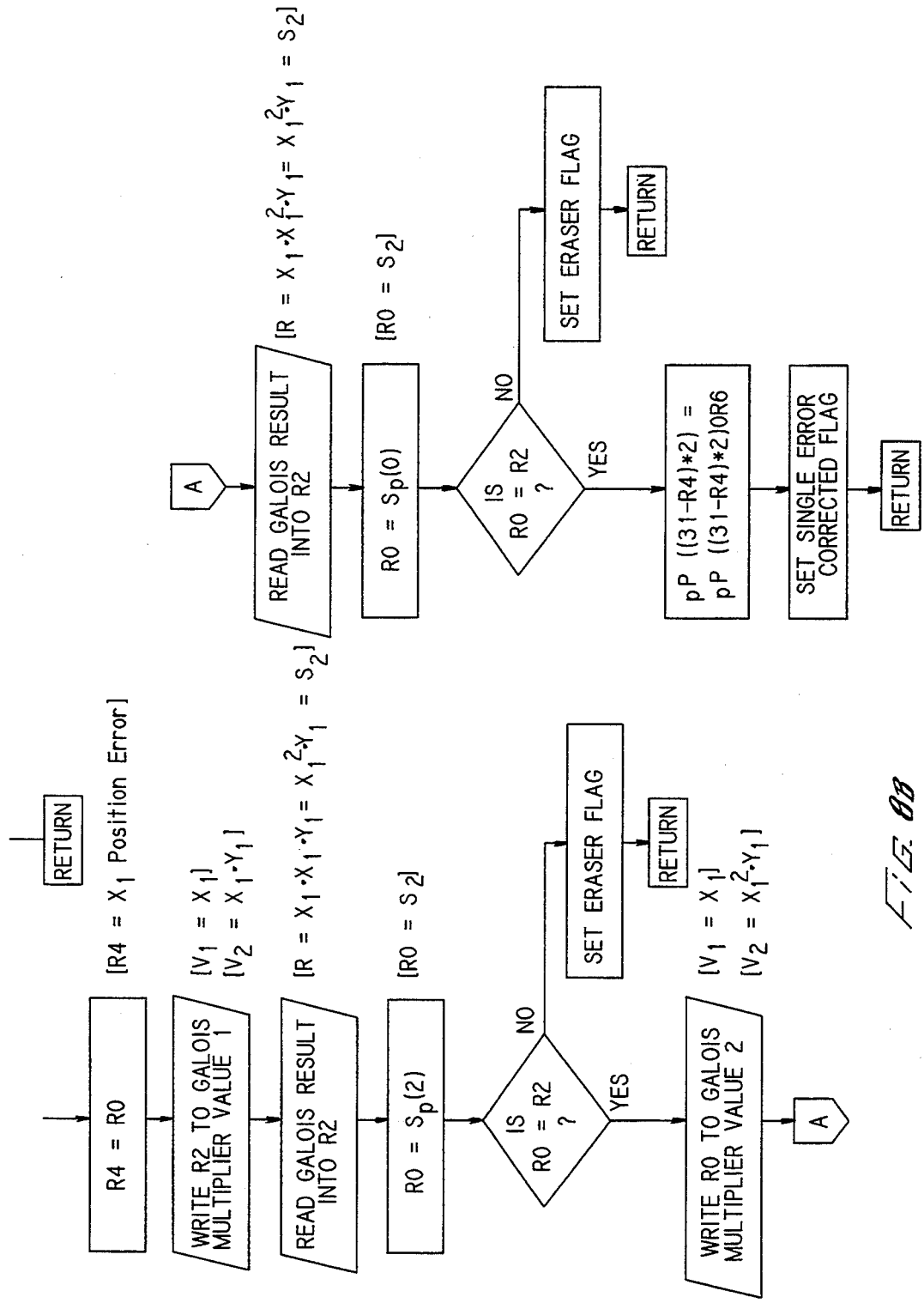
FIG. 8 is a flowchart of a C1 error correction subroutine to correct one C1 error according to the present invention.

FIG. 8 is a flowchart of a C1 error correction subroutine to correct one C1 error. Note that C1 is only checked over main data and that if there is more than one error in a block, then that block is flagged as a C2 erasure block. It is assumed that a non-zero C2 has been found and the FIG. 8 flowchart is then begun. All pointers are set up before calling the subroutine and four registers are used and indexes are utilized for the pointers such that the pointers are not changed (see below for detailed descriptions of the registers).

Figure 9A:
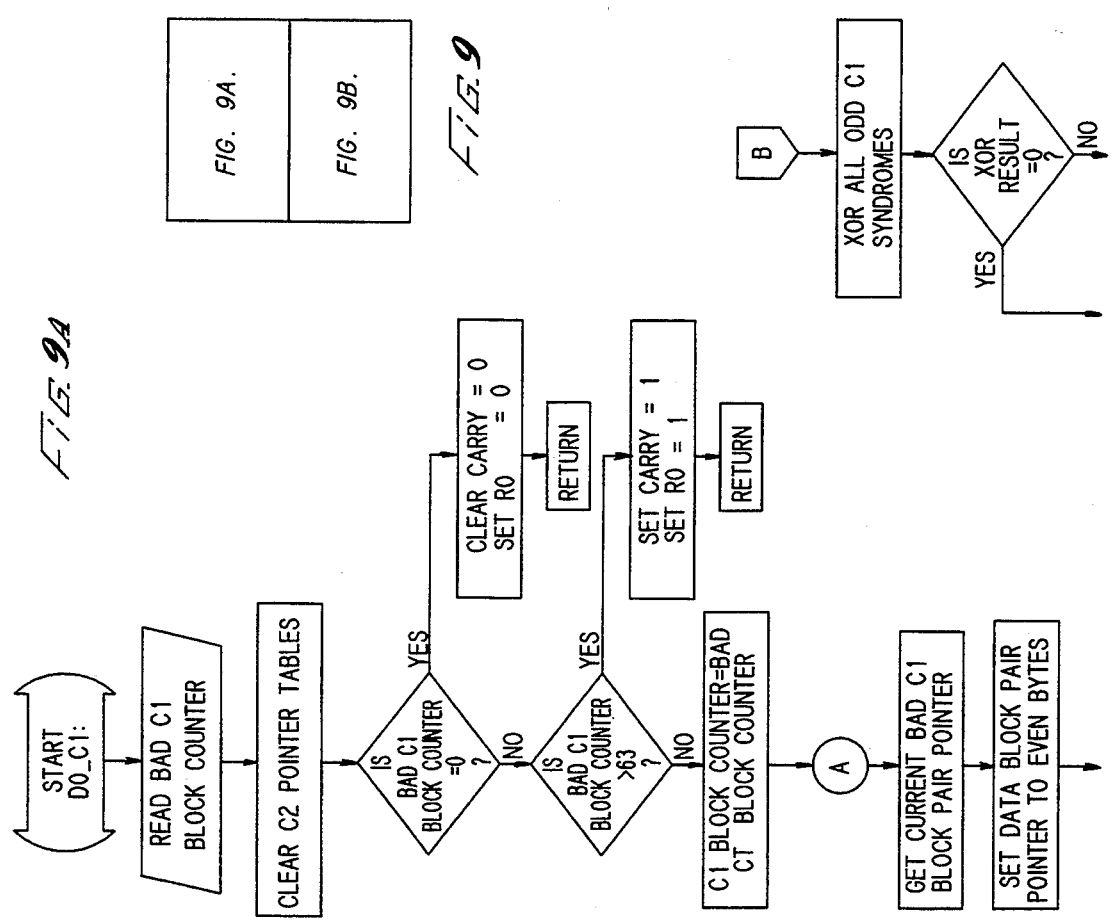
FIG. 9 is a flowchart of a C1 error correction and C2 mark erasures main subroutine according to the present invention.
Figure 9B:
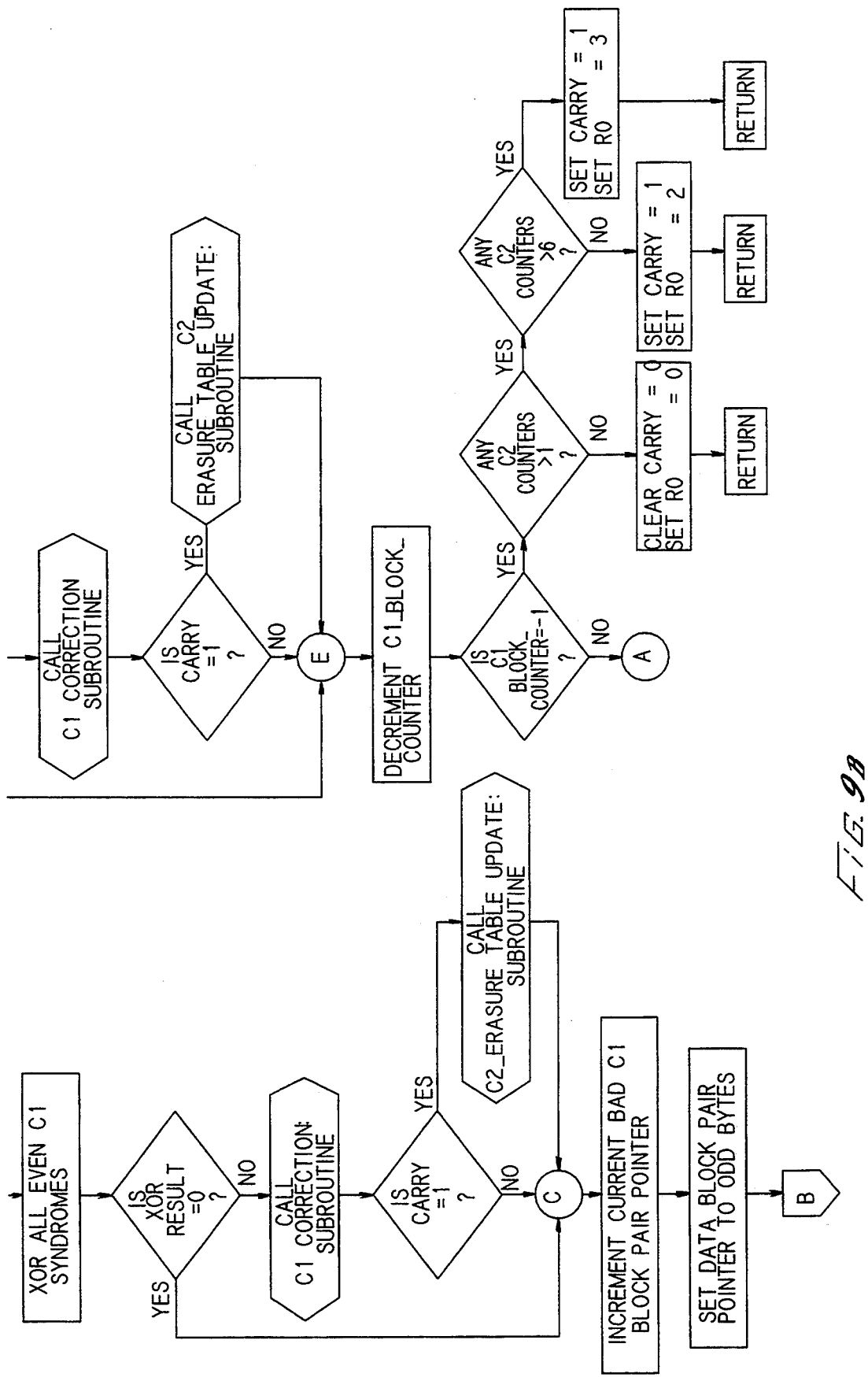
Figure 10:
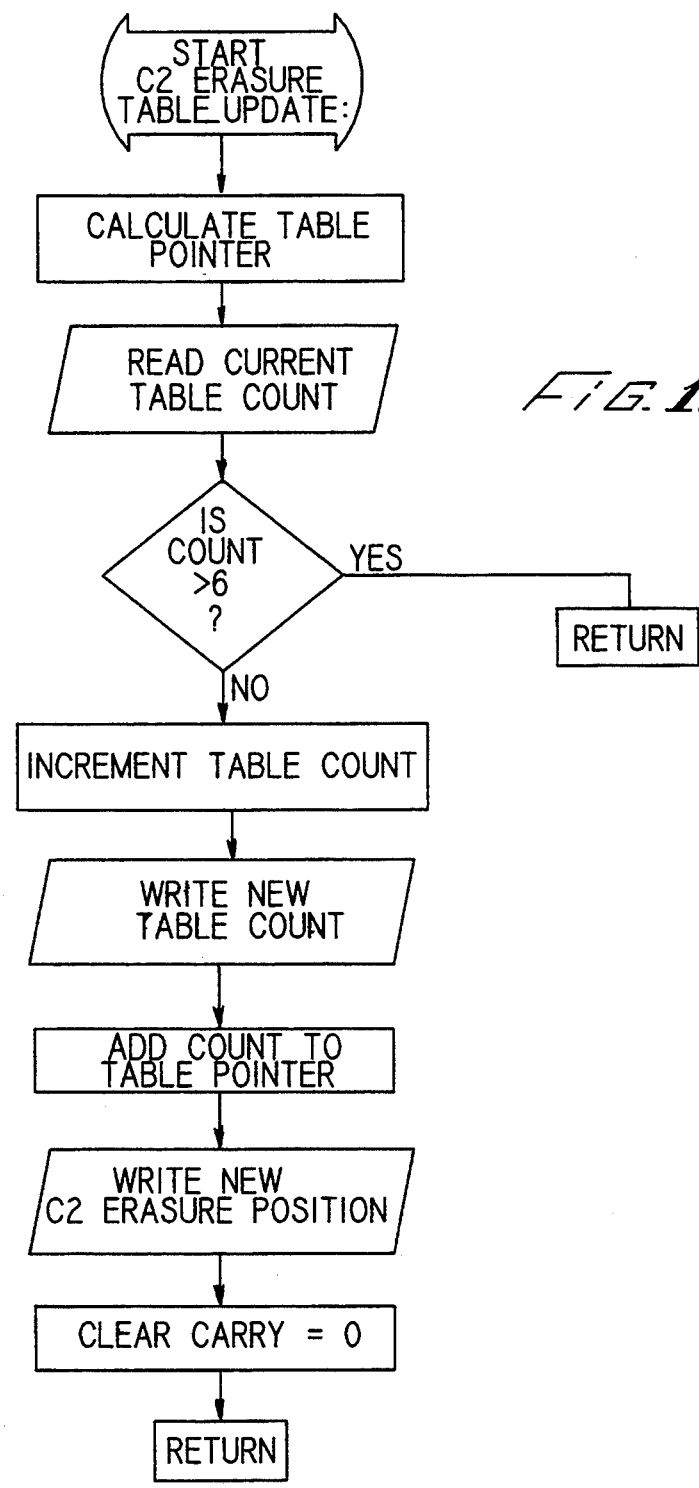
FIG. 10 is a flowchart of a C2 mark erasure main subroutine according to the present invention.

FIGS. 9 and 10 are flowcharts of a C1 error correction subroutine to correct C1 and to mark C2 erasures.

Figure 11:
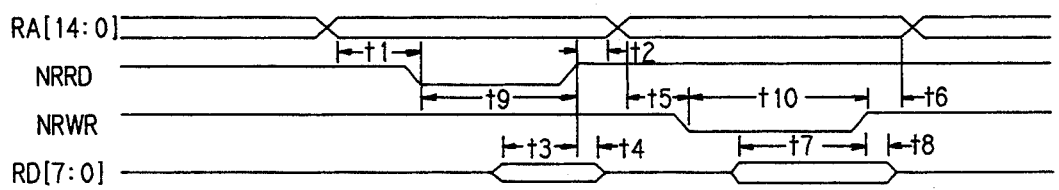
FIG. 11 is a frame buffer (SRAM) access timing diagram according to the present invention.
Figure 12:
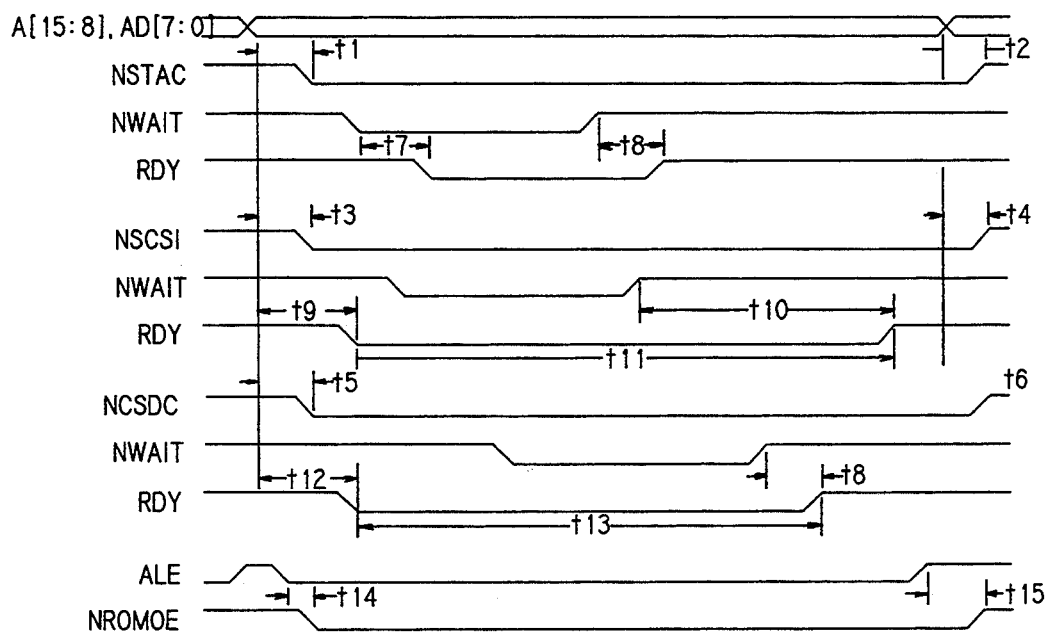
FIG. 12 is an address decode and RDY timing diagram according to the present invention.

The timing diagram for frame buffer 117 is shown in FIG. 11 with the timing descriptions listed in Appendix II. The address decode and ready timing diagram is shown in FIG. 12 with the timing descriptions listed in Appendix III.

Following is a detailed description of a preferred embodiment of formatter 110 including system environment. Appendix I shows a register map for the System for reference.

REGISTERS

All formatter 110 registers are accessed by microcontroller 105 one byte at a time. Registers that are larger than one byte are arranged in the memory map to match the processor's view of most significant byte to least significant byte. The memory map in microcontroller 105 places the lsbyte at the lower address (A+0) and the msbyte at the higher address (A+1). Table I shows the register map for formatter 110. A description of each register in Appendix I will be given.

SCSI Select Input Register

The SCSI Select Input Register in SCSI interface 102 (also referred to hereafter as SCSI controller 102) allows the microcontroller 105 to read the three SCSI address select pins. It is a read only register.

Bits 7–13 not used. Read back as 0.
Bit 2—SCSI Address Select Most Significant Bit.
Bit 1—SCSI Address Select Next Significant Bit.
Bit 0—SCSI Address Select Least Significant Bit.

When the Test Out bit in the Serdes Control Register 1 458 is set, the SCSI address select pins become output pins. The level of the output signals are readable by microcontroller 105. However, the levels read by microcontroller 105 which are not useful for the signals may be actively changing during the read cycle.

Referring to FIG. 4, the registers of formatter 110 will be described below.

DMA Control Register 438

This is a read/write register. It is cleared upon reset. The bit descriptions follow.

Bit 7—Enable Interleaving—This bit, when set, enables the interleaved address generation circuitry 504. When clear, addresses are generated sequentially.

Bit 6—Enable Randomizing—This bit, when set, enables randomizing and derandomizing of data at 506 and 507 respectively as the data is transferred between DMA channel 132 and frame buffer 117 (also referred to hereafter as SRAM 117). When cleared, data is transferred without change.

Bit 5—Throttle DMA. When cleared, DMA grants will occur as fast as formatter 110 can generate them (1 byte/10 clocks; @ 24 MHz=2.4 Mbyte/second). When set, DMA will not be granted another SRAM 117 cycle until time for five other SRAM 117 cycles to occur has passed. This will slow down the byte transfer rate to 1.33 Mbyte/second @ 24 MHz (1 byte/18 clocks). This is necessary because main data buffer 104 (also referred to hereafter as DRAM 104) buffer manager 103 allocates the DRAM bandwidth between the Controller 102 and the formatter 110 and gives formatter 110 the priority. In order to prevent the SCSI transfer from stopping, formatter 110's DMA requests must be slowed down.

Bit 4—Interleave Mode. When cleared, the interleave will follow the DDS standard formulas, and "i" will be initialized to 1. If the data bytes are DMAed in the following order, D0, D1, D2, D3, D4, etc.; the DDS standard formulas put these bytes at A1L, A1U, B1L, B1U, A2L, etc. The header is interleaved and placed in memory by microcontroller 105. When this bit is set, the interleave will follow the DATA DAT standard formulas, and "i" will be initialized to 0. If the data bytes are DMAed in the following order, D0, D1, D2, D3, D4, etc.; the DATA DAT standard formulas put these bytes at A0U, A0L, B0U, B0L, A1U, etc. DATA DAT has no header on a frame. If interleaving is disabled and this bit is clear, addresses are generated sequentially starting from 4. If interleaving is disabled and this bit is set, addresses are generated sequentially starting from 0.

Bit 3—Enable DMA—This bit, when set, enables formatter 110 to generate DMA requests. When cleared, the DMA request line immediately goes inactive, but any current SRAM 117 accesses complete.

Bit 2—RD/WR—This bit, when set, reads data from DMA channel 132 and writes it to SRAM 117. When cleared, it reads data from SRAM 117 and writes it to DMA channel 132.

Note: Since formatter 110 generates the DMA request signal and has no byte counter in it when set up to read from DMA channel 132 and write to SRAM 117, it will request a byte even if DRAM buffer manager 103 thinks the DMA is complete.

Bits 1-0—Buffer selection—These bits select the quarter of SRAM buffer 117 to be used in the DMA transfer. They are used as the upper two bits of the address when accessing SRAM 117. Note that the maximum DMA transfer in normal mode is limited to 8 Kbytes. Larger transfers will "wrap" around. With no interleaving enabled, an address counter wraps around after transferring either 8192 or 8188 bytes of data (dependent on the state of the Interleave Mode bit). With DDS interleaving enabled, the address counter wraps around after transferring 6652 bytes of data. With DATA DAT interleaving enabled, the address counter wraps around after transferring 6656 bytes of data. The buffer selection bits address SRAM 117 as follows:

00: Frame buffer at SRAM 117 addresses 8000-9FFFh.
01: Frame buffer at SRAM 117 addresses A000-BFFFh.
10: Frame buffer at SRAM 117 addresses C000-DFFFh.
11: Frame buffer at SRAM 117 addresses E000-FFFFh.

(Note that writing to buffer 11 will overwrite the special reserved data areas.)

Track 1 checksum Register 440

This 16 bit read only register keeps a running XOR "sum" on the data sent over DMA channel 132. As bytes transfer over DMA channel 132, the first two bytes are skipped by this register. All bytes "skipped" are used by the track 2 checksum register 442, 443. The next byte is XORed into the least significant byte of the register. The next byte is XORed into the most significant byte of the register. The next byte is XORed into the least significant byte of the register. The next byte is XORed into the most significant byte of the register. Then four bytes are skipped. The sequence of XORing four bytes and skipping four bytes is repeated until the DMA transfer ends. Checksums are calculated on non-randomized data. Checksums are always calculated. Checksum registers are cleared upon reset and when writing to the initialize DMA register. Note that for checksums to be correctly calculated according to the ANSI specification, the checksums must be cleared before each DMA transfer. Also because the header is not being DMAed over, it must be XORed into the checksum before the result is placed in the pack item.

Initialize DMA Register 438

Writing any value to the initialize DMA register will initialize the DMA transfer logic. It will initialize the byte counter, address pointer, interleave counters, checksum registers, and randomizer circuits used in transferring the data between main data buffer 117 on the buffer manager 103 chip and SRAM 117 on formatter 110. This is a write only register. Note that the Interleave Mode in the DMA control register must be set before initializing the DMA logic. Otherwise the DMA address counters will not initialize correctly.

Start ECC Register

Writing any value to start ECC register will start microcontroller 105—initiated ECC process as specified in ECC control register 444. This is a write only register.

Track 2 Checksum Register 442

This 16 bit read only register keeps a running XOR "sum" on the data sent over the DMA channel. As bytes transfer over the DMA channel, the first byte is XORed into the least significant byte of the register. The second byte is XORed into the most significant byte of the register. Four bytes are skipped in the DMA transfer. Al bytes "skipped" are used by the Track 1 Checksum Register 440, 441. The next byte is XORed into the least significant byte of the register. The next byte is XORed into the most significant byte of the register. The next byte is XORed into the least significant byte of the register. The next byte is XORed into the most significant byte of the register, then another four bytes are skipped. The sequence of XORing four bytes and skipping four bytes is repeated until the DMA transfer ends. Checksums are calculated on non-randomized data. Checksums are always calculated. Checksum registers 442, and 443 are cleared upon reset and when writing any value to the initialize DMA register. Note that for checksums to be correctly calculated according to the ANSI specification, the checksums must be cleared before each DMA transfer. Also because the header is not being DMAed over, it must be XORed into the checksum before the result is placed in the pack item.

Clear Arbitration Error Register

Writing any value to the clear arbitration error register will clear the arbitration error bit in the interrupt register 413. This is a write only register.

Bad C1 Block Counter 447

This read register is a counter. It is set to 0 by reset and by writing any value to this register. During normal reading from the tape and diagnostic read, it is equal to the count of the number of block pairs in the main data area which had non-zero C1 syndromes. Microcontroller 105 should clear it at the beginning of the read of each frame or track. It increments up to 255 and then rolls over to 0. This count can be used to indicate how many of the C1 block pointers are significant. Even though only the first 128 C1 block pointers detected since the last reset will be saved in memory, the counter will continue to count until reset. During read-after-write, for those block pairs in both the subdata area and the main data area which had non-zero syndromes, the eight bytes of syndromes associated with those blocks along with the block number are saved in SRAM 117 so microcontroller 105 can determine if they were single or multiple byte errors. The counter starts out at 0 and increments once for each byte saved in SRAM 117. In the end, it is equal to the (count) *9 of the number of block pairs which had non-zero C1 syndromes. Microcontroller 105 should clear it at the beginning of the read of each frame or track. It increments up to a maximum of 128. A maximum of 14 full sets of 9 bytes will be saved. The 8 syndrome bytes are written to SRAM 117 first followed by the block number. See the "SRAM 117 Memory Map" section entitled "Definition of entries" for further information on the locations of the syndromes and block numbers and the format of the block number bytes.

Read Track Checksum Register 260

During normal reading from the tape, diagnostic reads, and read-after-write, the data will be XORed into this 16 bit register to form a track checksum. ECC parity bytes will be skipped over and the correct bytes will be XORed in the high and low bytes of this register. It can be used to double check the data read. Note that errors detected in ECC must be taken into account when using the value calculated by this register. The read track checksum low byte register is a read only register and is cleared by writing to the read track checksum high byte register. The read track checksum high byte register is a read/clear register and is cleared by writing to the read track checksum high byte register. Microcontroller 105 should clear it at the start of each normal read, diagnostic read, and read-after-write of a track.

C2 Block Address Register 446

This register is a read only register and points to the block which just had non-zero ECC syndrome bytes saved in memory. Reading this register will clear the C2 Status bit in interrupt control register 413. This register only has significant information if the C2 Status bit is set and the non-zero C2 syndrome detected bit set and before restarting the ECC syndrome generation. This register contains an offset from the start of the track in frame buffer 117 to the first byte of the bad block. The register allows read access to a counter used to generate the addresses accessed while doing the microcontroller 105-initiated ECC syndrome and parity generation. If ECC syndrome or parity generation is in progress, writing a zero to the enable processor initiated ECC bit in ECC control register 444 will terminate the operation at the next block boundary. At reset and when operation is completed or terminated, this register is set to 00h. During microcontroller 105 initiated C1 generation, the value in this register is not be used by microcontroller 105 as sequence 206 does not stop when non-zero syndromes are detected. The counter may be changing when microcontroller 105 tries to read it. Bit 7 is not used and is always read back as 0. Bits 6-0 is offset, and offset from the start of a track in frame buffer 117.

For C2 ECC generation, this register "counts" in the following fashion: 00h, 40h, 01h, 41h, 02h, ... 1Fh, 5Fh, 20h, 60h, ... 36h, 76h, 37h, 77h. The hardware contains a normal counter which counts from 00h to 6Fh. The relationship of the counter's outputs to the address generated and value read from the register are as follows:

| Address Bits:    | 6  | 5  | 4  | 3  | 2  | 1  | 0  |
|------------------|----|----|----|----|----|----|----|
| Counter Outputs: | Q0 | Q6 | Q5 | Q4 | Q3 | Q2 | Q1 |

If the offset is 00h, the bytes of the block worked on are at offsets: Byte0 0000; byte1 0080; byte 2 0100; byte3 0180; byte 4 0200; byte 5 0280; byte 6 0300; byte7 0380; byte 8 0400; byte9 0480; byte10 0500; byte 11 0580; byte 12 0600; byte 13 0680 parity byte P5/syndrome byte S5; byte14 0700 parity byte P4/syndrome byte S4; byte15 0780 parity byte P3/syndrome byte S3; byte16 parity byte P2/syndrome byte S2; byte17 0880 parity byte P1/syndrome byte S1; byte18 0900 parity byte P0/syndrome byte S0; byte19 0980; byte20 0A00; byte21 0A80; byte22 0B00; byte23 0B80; byte24 0C00; byte 25 0C80; byte26 0D00; byte27 0D80; byte28 0E00; byte29 0E80; byte 30 0F00; byte 31 0F80. If the offset is 77h, the bytes of the block worked on are at offsets: byte0 0077; byte1 00F7; byte2 0177; byte3 01F7; byte4 02F7 ... byte29 0EF7; byte30 0F77; byte31 0FF7.

ECC Control Register 444

This is a read/write register. It is cleared upon reset. Following are the preferred bit settings.

Bit 7—Software Reset. When set, formatter 110 goes to its reset state. When clear, formatter 110 is not reset. This bit is set by an external reset or a microcontroller 105 write of a 1 to this bit. All other logic "cleared by reset" is cleared by both an external reset and a software reset.

Bit 6—Enable On-the-fly C1 Generation. When set, C1 parity and syndrome generation is done on the fly as data is sent to/received from the serdes. The operation, reading or writing, determines whether syndromes or parity is generated. When cleared and reading, the parity bytes read from tape are sent to memory. When cleared and writing, the parity bytes read from memory are written to the tape. Note that there is only one set of C1 generation logic so C1 can not be generated on the fly and at the same time be generated by microcontroller 105 initiation.

Bit 5—Enable Processor Initiated ECC. When clear, the "C1 and C2 ECC to Memory" sequencers are stopped and set to their initial state. When set, the ECC specified by bits 4-1 is enabled and can be started by writing any value to the Start ECC Register. An ECC process already in progress can be terminated by clearing this bit. Bits 4-1 are significant only when this bit is set.

Bit 4—C1/C2. When clear, C1 ECC generation is performed. When set, C2 ECC generation is performed. Note that this bit must be set up prior to setting the "Enable Processor Initiated ECC" bit. This bit and the "Enable Processor Initiated ECC" bit are not to be changed at the same time. Note that if this bit is clear and the "Enable Processor Initiated ECC" bit is set, then the serdes can do nothing else; it does not matter whether the ECC has been "started" or not.

Bit 3—Syndrome/Parity. When clear, parity bytes are generated. When set, syndrome bytes are generated.

Bit 2—Subdata/Main Data. When clear, ECC is generated over the track buffer area controlled by bit 1 of this register and bits 1 and 0 of DMA Control Register 438 and place the results in the appropriate memory locations. When set, ECC is generated over the subdata areas of the frame pointed to by bits 1 and 0 of DMA Control Register 438 (three block pairs are processed). Note that only C1 can be done on the subdata areas. This bit is a "don't care" when C2 is selected; C2 always works on main data.

Bit 1—Track A/B. When clear, ECC is generated over track A of frame buffer 117 pointed to by bits 1 and 0 of DMA Control Register 438. When set, ECC is generated over track B. When C1 and Subdata is selected, this bit is a "don't care".

Bit 0—Force Arbitration Error. When this bit is set, the Arbitration Error is forced active. When this bit is set, the Arbitration Error works normally and if active can be cleared by writing to the Clear Arbitration Error Register.

Examples for using ECC control register 444 follows:
Set this register to the following value in order to:

| | | |
|---|---|---|
| 01x1.xxxx | 1. | Generate C1 parity on fly when writing |
| 01x1.xxxx | 2. | Generate C1 syndrome on fly when reading |
| 0010.000x | 3. | Generate C1 parity over main data track A and write values to SRAM 117 |
| 0010.001x | 4. | Generate C1 parity over main data track B and write values to SRAM 117. |
| 0010.100x | 5. | Generate C1 syndrome over main data track A and write values to SRAM 117. |
| 0010.101x | 6. | Generate C1 syndrome over main data track B and write values to SRAM 117. |
| 0010.01xx | 7. | Generate C1 parity over write and read subdata areas and write values to SRAM 117. |
| 0010.11xx | 8. | Generate C1 syndrome over write and read subdata areas and write values to SRAM 117. |
| 0111.0x0x | 9. | Generate C2 parity over main data track A and write to SRAM 117 while C1 is done on the fly. |
| 0111.0x1x | 10. | Generate C2 parity over main data track B and write to SRAM 117 while C1 is done on the fly. |
| 0111.1x0x | 11. | Generate C2 syndrome over main data track A and write to SRAM 117 while C1 is done on the fly. |
| 0111.1x1x | 12. | Generate C2 syndrome over main data track B and write to SRAM 117 while C1 is done on the fly. |
| 00xx.xxxx | 13. | When writing, send data to serdes without generating C2 parity, instead of skipping over parity locations in SRAM 117, read the values in those locations and send them as the parity bytes. |
| 00xx.xxxx | 14. | When reading, read data from serdes sending the parity bytes read from the tape to memory. |

Serdes Control Register 0 457

This is a read/write register. It is cleared upon reset. The value read back is controlled by the Read Select bit in Serdes Control Register 1 458. No bits are auto cleared.

Bit 7—Read Enable. In general, this bit, when set, enables reading. This bit along with the Control Mode bits in Serdes Control Register 1 458 determine exactly what action occurs. This bit is latched on the synchronized changing edge of the TRKCLK signal. It can be set up for the next operation after the TRKCLK signal has transitioned.

Bit 6—Write Enable. In general, this bit, when set, enables writing. This bit along with the Control Mode bits in Serdes Control Register 1 458 determine exactly what action occurs. This bit is latched on the synchronized changing edge of the TRKCLK signal. It can be set up for the next operation after the TRKCLK signal has transitioned.

Bit 5—Enable Write to Main Data Only. When set, writing to the Pre-amble 2 and Main Data areas are enabled. When cleared, a whole track is written. This bit is latched on the synchronized changing edge of the TRKCLK signal. It can be set up for the next operation after the TRKCLK signal has transitioned.

Bit 4—Test ATF Area 2 Select. This bit is used for hardware testing only. The Write ATF Text bit in the Serdes Control Register 1 458 must be set when using this bit. When set, the ATF pattern for ATF Area 2 is generated. When clear, the ATF pattern for ATF Area 1 is generated.

Bit 3—Odd Frame. When clear, an even numbered (absolute number) frame is being accessed. When set, an odd numbered frame is being accessed. This is needed so the appropriate ATF signals will be generated on write. This bit is latched at the same time as bits 1 and 0. This bit is not used during reading or read after write.

Bit 2 Track A/B. When clear, use track A of the buffer pointed to by bits 1 and 0 of this register. When set, use track B. This bit is latched on the synchronized changing edge of the TRKCLK signal. It can be set up for the next operation after the TRKCLK signal has transitioned.

Bits 1-0—Buffer selection. These bits select which frame, subdata, ID, and Bad C1 pointer buffers are used in the transfer to/from the serdes. The bits are used as the upper two bits of the address when accessing SRAM 117. Note that the fourth quarter, both bits set, should not be used because it contains areas reserved for special information used during reading and writing to the tape. During normal write, diagnostic write, and raw code write, these bits are latched 13 block times (at the start of the subdata area) after the synchronized changing edge of the TRKCLK signal. During raw code write and read, these bits are really a "don't care" since data comes from/goes to the DMA. During normal read and diagnostic read, these bits are latched on the changing edge of the TRKCLK signal. NOTE: Bit 0 is used with bit 2 of the Serdes Control Register 1 458 in a special test mode.

Further clarification of what bits 7 and 6 enable follows:
NORMAL MODE:
76
00 Sequencer is turned off.
01 Write: Enable writing date to tape from the buffers pointed to by bits 2-0.
10 Read: Enable reading data from tape to the buffers pointed to by bits 2-0.
11 RAW: Enable Read-After-Write from tape to the buffers pointed to by bits 2-0.

During Write, subdata is taken from the "Subdata write data" buffer. IDs are taken from the "W1 eight block cycle" and four byte "SW1 SW2 for even and odd blocks" buffers. And main data from the half of frame buffer 117 for the selected track.

During Read, subdata is written to the "Subdata read data" buffer for the selected track. The IDs (sets of 3 bytes) are written to the "ID Entry for Subdata blocks" and ID Entry for Main data blocks" buffers for the selected track. And main data is written to the hale of the frame buffer 117 for the selected track. And Bad C1 pointers are written to the "Bad C1 Block Pointer" buffer.

During RAW, subdata is written to the "Subdata read data" buffer for the selected track. The IDs (sets of 3 bytes) are written to the "ID Entry for Subdata blocks" and ID Entry for Main data blocks" buffers for the selected track. And Bad C1 pointers and syndromes are written to the "Bad C1 Block Pointer" buffer. Main data is not written anywhere.

DIAGNOSTIC MODE: Through the use of both Diagnostic Write and Diagnostic Read, complete SERDES loop-back testing can be accomplished. Data transfers to/from main data buffer 104 only while the FMTT1 signal is active.

76

00 Sequencer 406 is turned off.

01 Diagnostic Write: Enable reading data from the buffers pointed to by bits 2-0 and writing code to buffer manager 405. During diagnostic write, data is read from the selected buffer in the SRAM 117 and processed by sequencer 406 just like it would be written to the tape, but instead of writing it to the tape, the raw code is deserialized and sent over DMA channel 132 to main data buffer 104.

10 Diagnostic Read: Enable reading code from the buffer manager and writing data to the buffers pointed to by bits 2-0. During diagnostic read, raw code is read from DMA channel 132 and is sent to the serdes where it is processed by sequence 406 just as it had been read from the tape.

11 Diagnostic Read After Write Enable reading code from buffer manager 405 and writing data to the buffers pointed to by bits 2-0. During diagnostic read, raw code is read from DMA channel 132 and is sent to the serdes where it is processed by sequencer 406 just as it had been read from the tape.

RAW CODE MODE: This mode provides raw code transfers to/from the tape. Data transfer to/from the buffer manager is gated by the FMTT1 signal allowing microcontroller 105 to select what data it wants to read or write.

76

00 Sequencer 406 is turned off.

01 Raw Code Write: Enable writing code from the buffer manager directly to the tape. During raw code write, raw code is read over DMA channel 132 from the main data buffer 104 serialized, and written out to tape.

10 Raw Code Read: Enable reading code from the tape and writing it to buffer manager 405. During raw code read, raw data is read from the tape, serialized and sent over DMA channel 132 to main data buffer 104.

11 Invalid combination. Sequencer 406 is turned off.

SEARCH MODE: Searching for the sync mark to indicate start of a block is gated by the FMT-T1 signal allowing microcontroller 105 to search for only subdata blocks. Blocks will always be stored in SRAM 117 on 32 byte boundaries. Once a sync is detected, the ID bytes are skipped and the next 32 bytes of data will be sent to the buffer in SRAM 117. This data may not be good if a track crossing occurs.

76

00 Sequencer is turned off.

01 Invalid combination. Sequencer 406 is turned off.

10 Enable reading data blocks to the track buffers pointed to by bits 2-0.

11 Invalid combination. Sequencer 406 is turned off.

Serdes Control Register 1 458

This is a read/write register. It is cleared upon reset. Bits 7-14 are active on any read cycle but typically should only be used during a diagnostic read.

Bit 7—Disable Serdes Clock. When clear, the Serdes runs off of the ReadClock signal from data separator 118 during all reading (except diagnostic read) and the write clock (crystal) during all writing and during diagnostic read. When set, the Serdes can only be clocked by writing to the bit pointer register 462.

Bit 6—Stop on Code Violation. When set, sequencer/serdes 406 will stop when the 10 bit to 8 bit demodulator ROM detects a code violation.

Bit 5—Stop on Sync Detect. When set, Sequencer/serdes 406 will stop when the sync symbol (10 bits) is detected.

Bit 4—Read Select. This bit, when set, selects the latched data when reading from Serdes Control Register 0 457. This bit, when clear, selects the unlatched data when reading from Serdes Control Register 0 457.

Bit 3—Test Out. When set, the SL0, SL1, SL2, NTRIS, and NACTI become debug outputs as described below.

Bit 2—Write ATF Test. This bit is used for hardware testing only. It should always be zero for normal operation. When set, data for the ATF area selected by Bit 4 in the Serdes Control Register 0 457 will be output on the WDAT pin.

Bits 1-0—Control Mode. These two bits determine how serdes handles the data and control where the data paths are selected.

10

00 Normal Mode.

01 Diagnostic Mode.

10 Raw Code Mode.

11 Search Mode.

Status Register 459

This register is a read/clear register. Writing any value to this register will clear bits 7-5. This register is cleared by reset.

Bit 7—NonZero C1 Syndrome Detected. When set, this bit areas were detected since the last time this bit was cleared.

Bit 6—Started Main Data on Block 1. When set, this bit indicates when the first sync mark was detected, the parity for the ID indicated the ID was good and the ID indicated that it was for block 1 (the second block) of the track. This bit stays set until cleared by microcontroller 105.

Bit 5—Sync Missed. When set, this bit indicates that after detecting sync, a subsequent sync mark was not detected for one of the main data blocks. This bit stays set until cleared by microcontroller 105.

Bit 4—Sync Detected. When set, this bit indicates that a sync mark was detected in the data stream. It is cleared by reset and by decoder 454 when the sync mark has passed. During normal reads, it is set for only one code bit time.

Bit 3—Code Violation Detected. When set, this bit indicates that a code violation was detected in decoder 454 when data was expected. It is cleared by reset and by decoder 454 when the violation passes. It could be set only for 10 code bit times (1 code byte/symbol time).

Bits 2-0—Unused. Reads back as 0.

Bit Pointer 462

Through this register, microcontroller 105 has access to the current bit number of the current byte the serdes is processing during diagnostic read. This is a read register. Writing any value to this register will pulse the bit clock. This is useful as a diagnostic and test feature.

Bits 7–4—Bit Number in code symbol. One of ten possible combinations to indicate the bit number. It counts in the following sequence: 0,1,3,2,4,8,9,B,A,C.

Bit 3—Not Used. Reads back as 0.

Bits 2–0—Bit Number in byte from DMA. Count from 0 to 7 to indicate which bit of the byte from DMA was just shifted in.

Byte Counter 465

Byte counter 465 counts the bytes/symbols in a block in 36 combinations. The counter is cleared by sequencer 406 at the start of each block. It is a read only register.

Bits 7–6—Not Used. Read back as 0.

Bits 5–0—Byte/Symbol Number. It counts in the following sequence: 00,03,04,01,02,05,18,1B,1C,19,1A,1D,20,23,24,21,22,25-,08,0B,0C,09,0A,0D,10,13,14,11,12,15,28,2B,2C,29-,2A,2D.

Block Counter 465

Block counter 465 counts the number of blocks in a state from 0 to a maximum of 127. The counter is cleared by sequencer 406 at the start of a state in normal operation. It is a read register. It is used to fill in the block address field (bits 6–0) of W2 of the MAIN ID. In search mode, microcontroller 105 will use this register to indicate how many blocks have been read in since the count was reset. When in search mode, microcontroller 105 can clear this counter by writing any value to this register. When not in search mode, only sequencer 406 or reset can clear it. When not in search mode, writing any value to this register will increment the block count. This feature was added to make it easier to test the part with a small number of test vectors. This feature is not used in normal operation.

Bit 7—Not Used. Read back as 0.

Bits 6–0—Block Number.

State Sequence

There is a state sequence for sequencer 406 which counts for each unique area in a track. The counter is cleared by the sequencer at the start of a track. It is read only register.

Bit 7—Amble Area. Set when in an amble area of the track.

Bit 6—Subdata Area. Set when in a subdata area of the track.

Bit 5—IBG Area. Set when in an IBG area of the track.

Bit 4—ATF Area. Set when in an ATF area of the track.

Bit 3—Main Data Area. Set when in the main data area of the track.

Bits 2–0—Section Number. The "sections" start counting at 0. Example: There are four IBG areas in a track. If the IBG Area bit is set and the section number is 2 then we are in the third IBG area of the track.

During Write operation, sequencer 406 will go through all of the areas in the proper order. During Read operations, sequencer 406 will never go through the ATF area, and it will mainly be in either the Subdata or Main Data Area.

Interrupt Register 413

The bits in Interrupt Register 413 are unique and described below. All bits are readable. Some are writable.

Bit 7—SCSI Controller Interrupt Request. This is a level active interrupt.

This is an external interrupt bit, reading a 1 corresponds to an interrupt condition. Writing will do nothing. The interrupt must be cleared or masked at the interrupt source.

Bit 6—DRAM Buffer Manager Interrupt Request. This is a level active interrupt.

This is an external interrupt bit, reading a 1 corresponds to an interrupt condition. Writing will do nothing. The interrupt must be cleared or masked at the interrupt source.

Bit 5—Code. When this read/write bit is set and the Special Address Space Decode Enable bit is set, all addresses are decoded as if in the CODE space. When clear and the Special Address Space Decode Enable bit is set, all addresses are decoded as if in the DATA space.

Bit 4—Special Address Space Decode Enable. When this read/write bit is set, the address decode ignores the INST pin and instead uses the CODE bit in place of the INST pin. When clear, the INST pin determines whether CODE or DATA space is decoded.

Bit 3—Arbitration Error Interrupt Mask. When this read/write bit is clear, the Arbitration Error interrupt is masked. When set, the Arbitration Error interrupt is enabled.

Bit 2—Arbitration Error Interrupt. When clear, the Arbitration Error interrupt is not active. When set, the Arbitration Error interrupt is active. The Arbitration Error interrupt indicates that two grants were issued by the SRAM 117. Arbitor 235 logic at the same time. This error will occur only for a bad chip. This interrupt can be cleared by writing any value to the Clear Arbitration Error Register.

Bit 1—Non-Zero C2 Syndromes Detected/C2 Syndrome Generation Complete. When set, non-zero ECC syndromes where detected and just written to memory. The ECC Block Pointer Register 444 contains the address of the block immediately following the block with non-zero syndromes. When this bit is clear and bit 0 is set, the ECC Syndrome Generation sequence has completed for the track specified. This is a status only bit. No interrupts occur when set. It is read only and is cleared on reset and when the ECC Start Register is written to.

Bit 0—C2 Status. This status bit is set when the C2 parity or syndrome generation is complete, or immediately after non-zero C2 syndromes were detected and written to memory and sequence 405 stopped. See bit 1 for status as to which event caused this. Both events will not occur at the same time. It is read only and cleared by reset and reading from the C2 Block Address Register 446.

Serial Port Address/Status Register 416

This register contains status, control and address bits that relate to the state of the Serial Part which is used to access registers in the ATF as described in ATF application Ser. No. 07/741,088, which is hereby incorporated by reference.

The address portion of this register specifies the address of the register in the ATF which is the source or destination for access via the serial port. Microcontroller 105 can safely read and write this register whenever it wants (as long as the serial port is READY); serial port transfers are actually initialized by accesses to the Serial Port Data Register 417. Writing to this register or the Serial Port Data Register 417 while the READY bit is clear is internally inhibited and has no effect. This is a read/write register but has some read only bits in it.

Bit 7—READY. This bit is 1 when the Serial Port is ready to accept a new request. This bit is 0 when the Serial Port is busy transferring data. The Serial Port Address Register 416 and the Serial Port Data Register 417 should only be accessed when READY is 1. For each transfer, READY goes low for 70 clocks (2.8 microseconds).

Bit 6—Serial Port Parity Error. This bit is 1 if the Serial Port detects a parity error during a read or write transfer. During a write transfer, parity is generated for the data on the serial data line. (This should never happen unless there is a hardware problem in the system.) It is automatically cleared to 0 any time microcontroller 105 writes to the Serial Port Address/Status 416. Note that this bit is only valid when READY is 1 and will toggle during the transfer.

Bit 5—Diagnostic Loopback. Bits 0-7 of the Serial Port Data Register 417, bits 0-4 of the Serial Port Address/Status Register 416 and several control bits (R/W, start bit, stop bit, and parity bit) all form one long shift register. When a serial access occurs, the bits are shifted out and other bits are shifted in. If the Diagnostic Loopback bit is clear, then the state of the Serial Data I/O pin "SDAT" is shifted in. This should match what was shifted out unless there is a hardware error or conflicts on driving the pin. Also, on a read access, the data portion will come from the other chip. If the Diagnostic Loopback bit is set, the data being shifted out is used as the data shifted in. This is done internally and the "SDAT" pin is forced high throughout the access. With the bit set, the hardware can be tested independent of the state of the "SDAT" pin and signal line.

Bits 4-0—Serial port access address. See ATF related application Ser. No. 07/741,088 for details.

Serial Port Data Register 417

This 8-bit read/write register is used to access registers in the ATF via the serial port. Note that the serial nature of the access is invisible from a processor viewpoint; microcontroller 105 simply does normal accesses to this register with certain timing and protocol constraints. This is a read/write register.

When microcontroller 105 wants to write to a register in the ATF, it sets up the appropriate address in formatter 110 Serial Port Address register 416 and then writes the data to the Serial Port Data Register. When microcontroller 105 writes to Serial Port Data Register 417, formatter 110 hardware performs the following sequence:

1. The data from microcontroller 105 is latched into the Serial Port Data Register 417 and the bus cycle is terminated. (i.e., this is a no-wait state cycle for microcontroller 105.)
2. The READY bit in the Serial Port Status Register 417 is cleared.
3. The contents of the Serial Port Address Register 416 are transferred to the ATF over the serial link, along with a "Write" bit. 6 bits of information are transferred.
4. The contents of Serial Port Data Register 417 are transferred to the ATF over the serial link, along with parity covering the entire 14 bit transfer. (Odd parity is used, i.e., all 0's is a parity error.) After the ATF confirms that the proper parity was received, it moves the data into the addressed register.

5. Formatter 110 ASIC checks parity on the transfer; if there is an error, the Serial Port Parity Error bit in the Serial Port Status Register 416 is set.
6. When the transfer is complete, the READY bit in the Serial Port Control Register is set. The entire write transfer takes 70 clocks (2.8 microseconds).
7. Bits 0-4 in the Address register and bits 0-7 in the Data register are updated during the transfer with the data that actually appears on the pin.

When microcontroller 105 wants to read from a register in the ATF, it sets up the appropriate address in formatter 110 Serial Port Address register 416 and then reads the Serial Port Data Register 417 TWICE. Microcontroller 105 must do two reads because the first read cycle requests the serial port to transfer the data up from the ATF and deposit it in the Serial Port Data Register 417; the second read gets the actual data. Successive read accesses may be pipelined, since the second read will also initiate a new transfer of data up from ATF.

When Microcontroller 105 reads from the Serial Port Data Register 417 formatter 110 hardware performs the following sequence:

1. The data currently in the Serial Port Data Register 417 is returned to microcontroller 105 and the bus cycle is terminated. (i.e., this is a no-wait state cycle for microcontroller 105.)
2. The READY bit in the Serial Port Status Register 416 is cleared.
3. The contents of the Serial Port Address Register 416 are transferred to the ATF over the serial link, along with a "Read" bit. 6 bits of information are transferred.
4. The contents of the addressed register in the ATF are transferred over the serial link to the Serial Port Data Register 417. The ATF also sends a parity bit covering the entire 14 bit transfer. (Odd parity is used, i.e., all 0's is a parity error.)
5. Formatter 110 checks parity on the transfer; if there is an error, the Serial Port Parity Error bit in the Serial Port Status Register 416 is set.
6. When the transfer is complete, the READY bit in the Serial Port Control Register is set (regardless of parity errors). The entire read transfer takes 70 clocks (3.7 microseconds).
7. Bits 0-4 in the Address register are updated during the transfer with the data that actually appears on the pin.

Galois Multiplier Value 1, Value 2, Result 418, 419, 420

These registers provide microcontroller 105 with a quick and simple way to do Galois Field multiplication. Having this capability can speed up the ECC correction algorithms. The Galois Field matches the field defined for C1, C2 and C3. Value 1 and Value 2 are multiplied to produce the Result. Value 1 and Value 2 are read/write registers. Result is a read only register. All three registers are a full eight bits. The contents of the two Value registers are combined logically to produce the result. The result is available immediately after the values are written into the Value registers.

The Galois Field is $GF(2^8)$ with generator polynomial;

$$g(X) = X^8 + X^4 + X^3 + X^2 + 1$$

A primitive element "a" in $GF(2^8)$ is defined as follows:

"a" = ( 0 0 0 0 0 0 1 0)
       $a^7 a^6 a^5 a^4 a^3 a^2 a^1 a^0$

Galois Square Root

This read only register provide microcontroller 105 with a quick and simple way to do Galois Field Square Roots. Having this capability can speed up the ECC correction algorithms. The Galois Field matches the field defined for C1, C2 and C3. The Galois Square Root is taken of the value in the Galois Multiplier Value 1 Register. The contents of the Value register is combined logically to produce the result. The result is available immediately after the value is written into the Value register.

RESOURCES

Aside from the above-described registers, other available resources in this embodiment of formatter 110 are described following. These resources include a system memory map, wait state generation, frame buffer 117 (SRAM in the preferred embodiment) access, frame buffer 117 memory map, arbitrator 235 priorities, interleave/deinterleaving, randomizing/derandomizing, ECC resources, and serdes.

System Memory Map

Formatter 110 decodes microcontroller 105's address space and produces chip selects for ROM 107, DRAM buffer manager 103, SCSI controller 102, data compression chip, formatter registers, SRAM 117, and ATF serial registers. Microcontroller 105 memory map is shown in Appendix IV.

In one embodiment of the present invention, microcontroller 105 is an 80C198 microprocessor which has an address space of 64K bytes and a signal pin "INST" which signals when an instruction byte is being fetched. In the present invention, the address space is doubled by using the INST pin and the "Special Address Space Decode Enable" and "Code" bits in the interrupt register to create a 64K byte CODE space and a 64K byte DATA space. This allows the system to include 63.5K bytes of firmware in CODE space as well as providing direct address mapping of the 32K byte frame buffer in DATA space. The "Special Address Space Decode Enable" and "Code" bits in the interrupt register provide flexible addressing modes so that special access cases can be handled, such as writing to CODE space to support flash EPROM and executing from DATA space to support downloaded diagnostic firmware routines. Addresses are decoded into CODE and DATA space in the following manner:

| Special Address Space Decode Enable bit | Code bit | INST pin | Decoded Space |
| --- | --- | --- | --- |
| 0 | X | 0 | DATA |
| 0 | X | 1 | CODE |
| 1 | 0 | X | DATA |
| 1 | 1 | X | CODE |

Wait state generation

Formatter 110 produces the READY signal going to microcontroller 105. The READY signal controls whether microcontroller 105 inserts wait states to extend its bus cycle. No wait states will be inserted for ROM cycles or Formatter register cycles. Access to the main buffer and SCSI controller 102 is controlled by the DRAM buffer manager 103. DRAM buffer manager 103 produces the NSWAIT signal when the bus cycle must be extended for accesses to SCSI controller 102. Formatter 110 must extend the NSWAIT signal an additional 4 clocks for SCSI Controller 102 accesses. Formatter 110 must force the ready line low for 5 clocks for Data Compression chip accesses to allow the chip time to produce its own wait signal. Processor accesses to SRAM 117 will cause wait states to be added to the bus cycles. Chip selects for DRAM buffer manager 103 and SCSI controller 102 are not ALE qualified in order to allow the DRAM buffer manager 103 time to procude its wait signal. The Data Compression chip select signal also is not ALE qualified.

SRAM Access

For each access, Formatter 110 will hold off microcontroller 105 until SRAM 117 can be accessed. Because formatter 110 must arbitrate between many requests for access to SRAM 117, the number of clocks RDY would be low and could vary from 8 to 35 with 11 being the typical case.

SRAM 117 Memory Map

In the preferred embodiment, 32K byte SRAM 117 is partitioned into 4 8K byte sections. The first, second, and third sections are reserved (in normal use) for the triple buffering of read and write data. Each section can store one frame's worth of user data and C1/C2 parity/syndromes. The fourth section is used as a storage area for both microcontroller 105 and formatter 110. All unspecified areas are free for use by microcontroller 105. See Appendix V for SRAM 117 addresses.

Definitions of entries

Bad C1 Block Pointer entries are 1 byte each as shown below.

Bit 7—Subdata Block Pair. This bit when set indicates the block number is from the subdata area. When clear, the block number is from the main data area.

Bit 6—Track B. This bit when set indicates the block number is from track B. When clear, the block number is from track A.

Bit 5-0—Block Pair Number. There are 64 block pairs in the main data area of a track. These six bits give the block pair number 0–63 of the pair with non-zero C1 syndromes. Note that the 6 bits of the block pair number are the six most significant bits of the block number for the track. For Subdata block pairs, these bits go from 0–3 for the first subdata area on a track and from 0–3 again for the second subdata area on a track.

ID Entries are three bytes each as shown below.
0 W1 or SW1
1 W2 or SW2
2 Parity SW2 Entries for writing are 1 byte. Bits 0–3 are filled in by the hardware with the block address. Bits 0–3 should have zeros written to them in SRAM 117. Bits 4–7 are used as read from the SRAM 117.

Note that W2 entries for writing are not stored in SRAM 117 because the whole byte is "filled in" by the hardware with the block address (bits 0–6) and bit 7 is always zero.

Byte usage of Scratch Area by the Formatter 110 are:
192 byte for subdata (write) info (triple buffered)
3 byte of SW1 for even blocks (triple buffered)
3 byte of SW1 for odd blocks (triple buffered)
3 byte of SW2 for even blocks (triple buffered)
3 byte of SW2 for odd blocks (triple buffered)
24 bytes of W1 for the cycle it goes through (triple buffered)

180 bytes of ID (3/blk, 2 blk subdata, 8 blk main data, triple buffered)

384 2 blocks/track of subdata (triple buffered)

384 byte of bad C1 block information (triple buffered)

This results in 1176 total used (14.3%) out of 8192 total available, leaving 7016 bytes available for microcontroller 105 usage.

Arbitration priorities

Formatter 110 arbitrates access to SRAM 117 by looking at access requests and generating grants/acknowledgements. The hard wired priority is shown below.

Highest: SERDES/"on the fly" C1 syndrome. The SERDES has a maximum transfer rate of 1236K byte/second (for 3% speed variation on 1200K byte/sec). The "on the fly" C1 syndrome has a burst transfer rate of 8M byte/second (1 byte/3 clocks) over 9 bytes for every 72 bytes read from the tape. By allowing the syndromes to monopolize the SRAM 117 accesses, the syndromes will be written to SRAM 117 before the next data byte is ready for ECC processing.

Next highest: DMA channel 132. Formatter 110 has a maximum transfer rate of 2.4M byte/second (1 byte/10 clocks). It can be throttled to 1.33M byte/sec (1 byte/18 clocks).

Next highest: Microcontroller 105.

Lowest: Processor Initiated ECC Parity/Syndrome generation. The ECC circuitry will use up all available cycles granted to it once it is started. Typically, when the circuitry is started, it will only have to share it with the SERDES channel. DMA channel 132 and processor tasks are sequenced to eliminate overlap between them and the ECC tasks.

SRAM 117 has a maximum transfer rate of 8.0M bytes/second. There is an arbiter checker which will be set whenever more then two grants were issued simultaneously. When set, a maskable interrupt is generated.

Interleave/uninterleaving

Interleaving occurs via the formulas found in the DDS and DATA/DAT standards documents incorporated by reference. In the DDS format, microcontroller 105 sending the four header bytes itself, interleaving on DMA transfers start with i−1 in the formula. In the DATA/DAT format, interleaving starts at i=0, and upper/lower byte ordering is reversed. See the DMA Control Register section above for interleaving controls.

Randomizing/unrandomizing

Randomizing occurs when data is transferred from the main buffer into SRAM 117. A randomizing pattern, specified by the DOS and DATA/DAT standards documents, is XORed with the data received over DMA channel 132. This happens before any interleaving occurs. Unrandomizing occurs when data is transferred from SRAM 117 to main data buffer 104. It occurs after deinterleaving and before driving the data on DMA bus channel 132. Note that since randomizing is XORing a pattern with the data, XORing the randomized data with the same pattern results in the original data. Randomizing can be disabled via DMA control register 438.

ECC Resources

The preferred embodiment of formatter 110 includes circuitry to generate parity bytes and syndrome bytes for the C1 and C2 ECC polynomials is described above. No circuitry is included for doing hardware error correction. Galois Multiplier and Galois Square Root functions are included to aid microcontroller 105 in analyzing the syndromes. The bad C1 Block data and RAW syndrome information is stored on SRAM 117 to aid microcontroller 105 in correcting small numbers of C1 errors per frame. For correcting larger amounts of C1 errors and all C2 errors. Microcontroller 105 must examine the syndrome bytes stored in SRAM 117 to determine if any errors occurred over the track. The same memory area is used for both Bad C1 Block data and RAW syndrome information. When normally reading, the Bad C1 Block data for both subdata and main data is stored in 128 bytes. The bytes are block pair numbers of blocks which had non-zero C1 syndromes. Microcontroller 105 must look at the syndromes to determine if the even or odd bytes or both had non-zero syndromes. Under Read-After-Write operation, the syndromes and block numbers of the first fourteen block pairs with non-zero syndromes are stored to help microcontroller 105 determine if the frame failed and should be rewritten. These block pairs come from both the subdata and main data areas. Again, microcontroller 105 must look at the syndromes to determine if the even or odd bytes or both had non-zero syndromes. In SRAM 117, first the block number is stored followed by the 8 syndrome bytes. The eight syndrome bytes are in the following order: S3 Even, S2 Even, S1 Even, S0 Even, S3 Odd, S2 Odd, S1 Odd, S0 Odd. See the Bad C1 Block Counter Register 447 description above for further details. For C1 processor-initiated parity generation, the eight parity bytes are written to SRAM 117 in the following order: S3 Even, S3 Odd, S2 Even, S2 Odd, S1 Even, S1 Odd, S0 Even, S0 Odd. For both C1 on the fly and processor-initiated C1 syndrome generation, the eight syndrome bytes are written to memory in the following order: S3 Even, S2 Even, S1 Even, S0 Even, S3 Odd, S2 Odd, S1 Odd, S0 Odd. Note that the ordering is different from parity generation. When C1 on the Fly is turned off, the C1 parity and syndrome logic is disabled. When writing (Normal Write or Diagnostic Write), the parity is read from the eight bytes at the end of each block pair and written to tape. When reading (Normal Read, Read After Write, or Diagnostic Read), the parity read from tape is written to the eight bytes at the end of each block pair. Syndromes are not generated. In preparing a frame or track for writing with C1 on the fly turned off, processor-initiated C1 can be used to generate correct parity. In the same way, if a frame or track was read in with C1 on the fly turned off, processor-initiated C1 can be used to generate the syndromes to test if any errors occurred and bytes need to be corrected. Note that if Processor-initiated C1 is enabled, then the SERDES can not be doing anything else.

SERDES Resources

The serdes during writing runs off of the crystal clock. When reading, the SERDES will run off the RDCLK from the data separator 118. When switching from reading to writing, the SERDES switches the clock over glitchlessly. The SERDES sequencer in sequencer 406, once it has detected a "sync" mark, will expect all following sync marks to be detected within a window which is plus and minus 1 bit time from the ideal time for detection. The SERGES sequencer will resync itself to the new sync mark when it is detected. If the sync is not detected within the windows, SERDES sequencer will "generate its own sync mark" and read in a block and try to detect the next sync mark.

SEQUENCES

The sequences of actions performed by formatter 110 are described following. These sequences include writing and reading a track by a read/write sequencer, DMA transfer, writing a frame, RAW, reading a frame, searching subdata blocks, appending, diagnostic read/write, read/write raw code, handling missing sync marks, and a phase lock loop (PLL) algorithm, all by a software sequence. The sequences are defined as follows.

Read/Write Sequencer 453: Writing a track

Read/Write Sequencer 453 does everything on a track basis, and runs off of a byte clock. Note that once something is "passed through" the 8-10 encoder logic, it is also serialized and shifted out to write channel 133. A counter is cleared by the synchronized changing edge of the TRKCLK signal. It counts up based on a byte count generated from a crystal write clock.

The Sequence is as follows:

(1) Clear subdata block counter, and main data block counter, (2) Generate MARGIN 1 pattern: Disable and bypass the 8-10 encoder logic, (3) Generate a constant 1 pattern for 11 blocks. (11*360 bits=3930 bits), (4) Generate PRE-AMBLE 1 pattern. Disable and bypass the 8-10 encoder logic, (5) Generate a constant 1 pattern for 2 blocks. (2*360 bits=720 bits), (6) Generate Subdata area: Enable data to pass through the 8-10 encoder logic.

At point AAA, (1) Tell the encoder to generate the Sync symbol, (2) select the Subdata ID start address, (3) read the SW1 field from SRAM 117 and send it through the 8-10 and latch it for parity generation, (4) increment the ID byte pointer, (5) read the SW2 field from SRAM 117 and send it through the 8-10 encoder logic and Xor it with the SW1 value, (6) latch the XOR result, (7) increment the ID byte pointer, (8) send the XOR result (parity) through the 8-10 encoder logic, (9) enable the C1 ECC generation and initialize the registers to zero, (10) select the subdata block start address. Then, in sequence, (1) read the subdata data pointed to by the block byte pointer and send it through the 8-10 encoder and, if C1 on the fly generation is enabled, to the C1 generator circuits, (2) increment the block byte pointer, and repeat for 31 more bytes (32 total).

Next, increment the block counter and, in sequence, (1) generate the Sync symbol, (2) select the ID byte pointer, (3) read the SW1 field from SRAM 117 and send it through the 8-10 encoder logic and latch it for parity generation, (4) increment the ID byte pointer, (5) read the SW2 field from SRAM 117 and send it through 8-10 encode logic and Xor it with the SW1 value, (6) send the XOR result, (7) increment the ID byte pointer, (8) send the XOR result (parity) through the 8-10 encoder logic.

Next, in sequence, (1) Read the subdata data pointed to by the block byte pointer and send it through the 8-10 encoder logic and, if C1 on the fly generation is enabled, to the C1 generator circuits, (2) increment the block byte pointer, (3) repeat for 23 more bytes, (24 total).

Next, in sequence, if C1 on the fly generation is enabled, (1) read the C1 generated parity bytes and send them through the 8-10 encoder logic, read them in the following sequence: Even X3, odd X3, even X2, odd X2, even X1, odd X1, even X0, odd X0), (2) if C1 on the fly generation is disabled, read the subdata data pointed to by the block byte pointer and send it through the 8-10 encoder logic, (3) increment the block byte pointer, and repeat for 7 more bytes (8 total), then (4) increment the block counter, and (5) clear the block byte pointer.

Repeat from point AAA three more times, (four passes total; two blocks per pass making eight blocks total).

Next, in sequence, (1) generate POST-AMBLE 1 pattern, by disabling and bypassing the 8-10 encoder logic to generate a constant 1 pattern for 1 blocks. (1*360 bits=360 bits), (2) generate Inter Block Gap (IBG) 1 pattern by disabling and bypassing the 8-10 encoder logic, and generating a 100100 pattern for 3 blocks. (3*360 bits=1080 bits), (3) generate ATF 1 pattern by generating the pattern for whatever azimuth track is selected and based on the odd frame bit (even addresses have a different pattern from odd addresses), by disabling and bypassing the 8-10 encoder logic, (4) generate the varying pattern for the 5 blocks of the ATF area, (5*360 bits=1800 bits), assert the NPILOT pin when writing the pilot blocks.) (5) generate Inter Block Gap (IBG) 2 pattern by disabling and bypassing the 8-10 encoder logic and generating a 100100 pattern for 3 blocks (3*360 bits=1080 bits), (6) generate PRE-AMBLE 2 pattern by disabling and bypassing the 8-10 encoder logic to generate a constant 1 pattern for 2 blocks, (2*360 bits=720 bits), (7) generate MAIN data area by enabling data to pass through the 8-10 encoder logic, (8) select the main data block start address for the positive azimuth track.

At point BBB, select the main data ID address.

At point CCC, perform the following sequence:

(1) generate the Sync symbol, (2) read the W1 field from SRAM 117 and send it through the 8-10 encoder logic and Xor it with the block counter and main data block identifier bit for parity generation, (3) latch the XOR result, (4) increment the ID byte pointer (5) pass the block counter and main data block identifier bit (always zero) through the 8-10 encoder logic, (7) enable the C1 ECC generation and initialize the registers to zero.

Next, in sequence, (1) read the main data pointed to by the block byte pointer and send it through the 8-10 encoder logic and, if C1 on the fly generation is enabled, to the C1 generator circuits, (2) increment the block address pointer, (3) repeat for 31 more bytes, (32 total).

Next, increment the block counter.

Then, in sequence, (1) generate the Sync symbol (2) read the W1 field pointed to by the ID byte pointer from SRAM 117 and send it through the 8-10 encoder logic and Xor it with the block counter and main data block identifier bit for parity generation, (3) latch the XOR result, (4) increment the ID byte pointer, (5) generate the W2 field from the block counter and main data block identifier (always zero) and pass it through the 8-10 encoder logic, (6) send the XOR result (parity) through the 8-10 encoder logic.

Next, in sequence, (1) read the main data pointed to by the block byte pointer and send it through the 8-10 encoder logic and, if C1 on the fly generation is enabled, to the C1 generator circuits and (2) increment the block byte pointer. Repeat for 23 more bytes (24 total).

If C1 on the fly generation is enabled, (1) read the C1 generated parity bytes and send them through the 8-10 encoder logic, read them in the following sequence: Even X3, odd X3, even X2, odd X2, even X1, odd X1, even X0, odd X0.

If C1 on the fly generation is disabled, read the main data pointed to by the block byte pointer and send it through the 8-10 encoder logic and increment the block byte pointer, and repeat for 7 more bytes (8 total).

If C1 on the fly generation is enabled, clear the block byte pointer eight times to skip over the C1 parity areas. Then increment the block counter and clear the block byte pointer. Repeat from point CCC three more times (four total passes; two blocks per pass makes eight blocks; which completes the W1 ID cycle). Repeat from point BBB fifteen more times. (sixteen total passes; 16*8=128 blocks in a track).

Next, in sequence, generate Inter Block Gap (IBG) 3 pattern by disabling and bypassing the 8-10 encoder logic. Generate a 100100 pattern for 3 blocks. (3*360 bits=1080 bits).

Then generate ATF 2 pattern by generating the pattern for whatever azimuth track is selected and based on the odd frame bit. Disable and bypass the 8-10 encoder logic and generate the varying pattern for the 5 blocks of the ATF area (5*360 bits making 1800 bits) (Assert the Pilot Output signal when writing the pilot blocks.)

Then generate Inter Block Gap (IBG) 4 pattern by Disabling and bypassing the 8-10 encoder logic and generating a 100100 pattern for 3 blocks, (3*360 bits=1080 bits).

Then generate PRE-AMBLE 3 pattern by disabling and bypassing the 8-10 encoder logic, and generating a constant 1 pattern for 2 blocks (2*360 bits=720 bits).

Then generate second subdata area by enabling data to pass through the 8-10 encoder logic.

At point DDD, (1) generate the Sync symbol, (2) select the Subdata ID start address, (3) read the SW1 field from SRAM 117 and send it through the 8-10 encoder logic and latch it for parity generation, (4) increment the ID byte pointer, (5) read the SW2 field from SRAM 117 and send it through the 8-10 encoder logic and Xor it with the SW1 value, (6) latch the XOR result, (7) increment the ID byte pointer, (8) send the XOR result (parity) through the 8-10 encoder logic, (9) enable the C1 ECC generation and initialize the registers to zero, and select the subdata block start address.

Then, in sequence, read the subdata data pointed to by the block byte pointer and send it through the 8-10 encoder logic and, if C1 on the fly generation is enabled, to the C1 generator circuits and increment the block byte pointer. Repeat for 31 more bytes (32 total.

Next, increment the block counter. Then (1) generate the Sync symbol, (2) select the ID byte pointer, (3) read the SW1 field from SRAM 117 and send it through the 8-10 encoder logic and latch it for parity generation, (4) increment the ID byte pointer, (5) read the SW2 field from SRAM 117 and send it through the 8-10 encoder logic and Xor it with the SW1 value, (6) latch the XOR result, (7) increment the ID byte pointer, (8) send the XOR result (parity) through the 8-10 ROM.

Then, in sequence, read the subdata data pointed to by the block byte pointer and send it through the 8-10 encoder logic and, if C1 on the fly generation is enabled, to the C1 generator circuits. Increment the block address pointer. Repeat for 23 more bytes (24 total).

If C1 on the fly generation is enabled, read the C1 generated parity bytes and send them through the 8-10 encoder logic. Read them in the following sequence: Even X3, odd X3, even X2, odd X2, even X1, odd X1, even X0, odd X0. If C1 on the fly generation is disabled, read the subdata data pointed to by the block address pointer and send it through the 8-10 encoder logic. Increment the block byte pointer. Repeat for 7 more bytes (8 total).

Next, increment the block counter and clear the block byte pointer. Repeat from point DDD three more times (four passes total; two blocks per pass making 8 blocks total).

Next, generate POST-AMBLE 2 pattern by disabling and bypassing the 8-10 encoder logic and generating a constant 1 pattern for 1 block (1*360 bits=360 bits).

Then, generate MARGIN 2 pattern by disabling and bypassing the 8-10 encoder logic and generating a constant 1 pattern for 11 blocks (11*360 bits=3930 bits).

Insert the Read-After-Write sequence at this point. This sequence reads what was written on the opposite azimuth track of the previous frame. When finished, microcontroller 105 must decide whether rewriting that frame is necessary.

Read/Write Sequencer 453: Reading a track

A counter is cleared by the synchronized changing edge of the TRKCLK signal. It counts up based on a byte count generated from the crystal write clock and the read data clock from data separator 118. If at any time while reading sequencer 453 does not detect a sync mark within its window and must generate its own sync mark, the Sync Missed bit in Status Register 416 must be set. The MARGIN 1 and PRE-AMBLE pattern comes in here. They are the same constant 1s pattern. The pattern continues for at most 13 blocks. (13*360 bits=4680 bits). Acquire PLL lock to the data (see section on PLL Algorithm for details below). Read the subdata area: Clear a flag indicating "stop writing subdata blocks to SRAM 117", and enable the 10-8 decoder logic.

At point AAA, select the address for the "Read Subdata for the selected azimuth track", and then (1) detect the sync byte, (2) clear the "byte/symbol" counter to synchronize to the data, (3) enable the C1 syndrome generation circuits and initialize to zero, (4) clear the ID byte pointer and (5) clear the block byte pointer.

Next, (1) fetch the decoded SW1 byte from the 10-8 decoder logic. For the first pass only, write the byte to the SRAM 117 location pointed to by the ID address pointer, and increment the ID byte pointer, (2) fetch the decoded SW2 byte from the 10-8 decoder logic (for the first pass only, write the byte to the SRAM 117 location pointed to by the ID byte pointer, and increment the ID pointer), (3) fetch the decoded parity byte from the 10-8 decoder logic (for the first pass only, write the byte to the SRAM 117 location pointed to by the ID byte pointer, and increment the ID byte pointer).

Next, fetch the decoded byte from the 10-8 decoder logic. If the "stop writing subdata blocks to SRAM 117" flag is clear, then write the byte to the SRAM 117 location pointed to by the block byte pointer and send the byte to the C1 syndrome generation circuits, otherwise do nothing. Then increment the block byte pointer. Repeat this for 31 more bytes.

Next, detect the sync byte and clear the "byte/symbol" counter to synchronize to the data.

Then, (1) fetch the decoded SW1 byte from the 10-8 decoder logic (for the first pass only, write the byte to the SRAM 117 location pointed to by the ID address pointer, and increment the ID pointer), (2) fetch the decoded SW2 byte from the 10-8 ROM (for the first pass only, write the byte to the SRAM 117 location pointed to by the ID address pointer and increment the ID pointer), (3) fetch the decoded parity byte from the 10-8 decoder logic (for the first pass only, write the byte to the SRAM 117 location pointed to by the ID byte pointer, and increment the ID byte pointer).

Then, fetch the decoded byte from the 10-8 decoder logic. If the "stop writing subdata blocks to SRAM 117" flag is clear, then write the byte to the SRAM 117 location pointed to by the block address pointer and send the byte to the C1 syndrome generation circuits, and increment the block byte pointer. Repeat for 23 more bytes.

Next, fetch the decoded byte from the 10-8 decoder logic. If the "stop writing subdata blocks to SRAM 117" flag is clear, then send the byte to the C1 syndrome generation circuits. If the "Enable on-the-fly C1 Generation" bit in the ECC control register is cleared and if the "stop writing subdata blocks to SRAM 117" flag is clear, then write the byte to the SRAM 117 location pointed to by the block byte pointer and increment the block byte pointer. Repeat for 7 more bytes. If the eight syndrome bytes are all zero, set a flag indicating stop writing subdata block data to SRAM 117.

If the "Enable on-the-fly C1 generation" bit in the ECC control register is cleared, skip this paragraph. If the "stop writing subdata blocks to SRAM 117" flag is clear, then write the syndrome bytes to the SRAM 117 location pointed to by the block byte pointer, incrementing the block byte pointer after each cycle. Write them in the following sequence: Even X3, even X2, even X1, even X0, odd X3, odd X2, odd X1, odd X0.

Repeat from point AAA for 3 more times (2 blocks per pass; 8 blocks total processed).

The POST-AMBLE pattern enters here as a constant 1 pattern for 1 block (360 bits), with the PLL locked to the write clock (crystal).

Next is the ATF timings. The lead sequencer is not involved in this other then to count past it.

Next the PRE-AMBLE 2 pattern comes in as a constant 1s pattern. Continuing for at most 2 blocks with PLL lock to the data. See the section on PLL Algorithm for details below.

Next is reading the main data area comprising the sequence following:

select the main data block start address for whatever azimuth track is selected and clear the "stop writing main data ID to SRAM 117" flag. Then select the "Read Main data IDs for the selected azimuth track" start address.

At point DDD after eight blocks are read in, set the "stop writing main data ID to SRAM" flag. Next, detect the sync byte and clear the "byte/symbol" counter to synchronize to the data. Enable the C1 syndrome generation circuits and initialize to zero. Then (1) fetch the decoded W1 byte from the 10-8 decoder logic (if the "stop writing main data ID to SRAM 117" flag is clear, then write the byte to the SRAM 117 location pointed to by the ID byte pointer, and increment the ID byte pointer), (2) latch the byte for parity checking, (3) fetch the decoded W2 byte from the 10-8 decoder logic (if the "stop writing main data ID to SRAM 117" flag is clear, then write the byte to the SRAM 117 location pointed to by the ID byte pointer, and increment the ID byte pointer), (4) latch the byte, (5) Xor the byte with the previous byte and latch the result, (6) fetch the decoded parity byte from the 10-8 decoder logic (if the "stop writing main data ID to SRAM 117" flag is clear, then write the byte to the SRAM 117 location pointed to by the ID byte pointer, and increment the ID byte pointer), (7) Xor the byte with the previous XOR result. On the first pass through this, if the XOR result is zero, check the block number in W2 and compare it to the expected block number (0). If the read block number is not 0, then set the Missing First Block Detected bit in the Status Register. If the read block number is odd, then increment the block count and go to point DDD1. Next, fetch the decoded byte from the 10-8 decoder logic and write the byte to the SRAM 117 location pointed to by the block byte pointer. Send the byte to the C1 syndrome generation circuits. Increment the block byte pointer and repeat for 31 more bytes.

Then detect the sync byte and clear the "byte/symbol" counter to synchronize to the data. Then (1) fetch the decoded W1 byte from the 10-8 decoder logic (if the "stop writing main data ID to SRAM 117" flag is clear, then write the byte to the SRAM 117 location pointed to by the ID byte pointer, and increment the ID byte pointer), (2) latch the byte for parity checking, (3) fetch the decoded W2 byte from the 10-8 ROM (if the "stop writing main data ID to SRAM 117" flag is clear, then write the byte to the SRAM 117 location pointed to by the ID byte pointer, and increment the ID byte pointer), (4) latch the byte, (5) Xor the byte with the previous byte and latch the result, (6) fetch the decoded parity byte from the 10-8 decoder logic (if the "stop writing main data ID to SRAM 117" flag is clear, then write the byte to the SRAM 117 location pointed to by the ID byte pointer, and increment the ID byte pointer), (7) Xor the byte with the previous XOR result.

At point DDD1, fetch the decoded byte from the 10-8 decoder logic, write the byte to the SRAM 117 location pointed to by the block byte pointer, send the byte to the C1 syndrome generation circuits, and increment the block byte pointer. Repeat for 23 more bytes. Then fetch the decoded byte from the 10-8 decoder logic and send the byte to the C1 syndrome generation circuits. If the "Enable on-the-fly C1 Generation" bit in the ECC control register is cleared, write the byte to the SRAM 117 location pointed to by the block address pointer and increment the block byte pointer. Repeat for 7 more bytes. If the eight syndrome bytes are not all zero, set the NonZero C1 Syndrome detected bit in the Status Register. If the "Enable on-the-fly C1 Generation" bit in the ECC control register is cleared, skip the following sequence. Otherwise, write the syndrome bytes to the SRAM 117 location pointed to by the generated address, incrementing the block byte pointer after each cycle. Write them in the following sequence: Even X3, even X2, even X1, even X0, odd X3, odd X2, odd X1, odd X0.

Repeat from point DDD for 63 more times (64 total passes; 2 blocks per pass; 128 blocks total processed).

ATF timings enter at this point. The read sequencer does not get involved in this other then to count past it. Lock the PLL to the write clock (crystal).

The PRE-AMBLE pattern enters here as a constant 1s pattern which continues for at most 2 blocks. Acquire PLL lock to the data (see section on PLL Algorithm for details below)

Next operation is to read the Subdata Area 2.

At point EEE, (1) select the "Read Subdata for the selected azimuth tracks" start address, (2) detect the sync byte, (3) clear the "byte/symbol" counter to synchronize to the data, (4) enable the C1 syndrome generation circuits and initialize to zero, (5) select the "Read Subdata IDs for the selected azimuth track" start address, (6) select the "Read Subdata IDs for the selected azimuth track" start address. Then fetch the decoded SW1 byte from the 10-8 decoder logic (if the "stop writing subdata blocks to SRAM 117" flag is clear, then write the byte to the SRAM 117 location pointed to by the ID byte pointer, and increment the ID byte pointer), fetch the decoded SW2 byte from the 10-8 decoder logic (if the "stop writing subdata blocks to SRAM 117" flag is clear, then write the byte to the SRAM 117 location pointed to by the ID byte pointer, and increment the ID byte pointer), fetch the decoded parity byte from the 10-8 decoder logic (if the "stop writing subdata blocks to SRAM 117" flag is clear, then write the byte to the SRAM 117 location pointed to by the ID byte pointer, and increment the ID byte pointer).

Next, fetch the decoded byte from the 10-8 decoder logic (if the "stop writing subdata blocks to SRAM 117" flag is clear, then write the byte to the SRAM 117 location pointed to by the block byte pointer and send the byte to the C1 syndrome generation circuits), increment the block byte pointer, and repeat for 31 more times.

Next, detect the sync byte and clear the "byte/symbol" counter to synchronize to the data. Then, fetch the decoded SW1 byte from the 10-8 decoder logic (if the "stop writing subdata blocks to SRAM 117" flag is clear, then write the byte to the SRAM 117 location pointed to by the ID byte pointer, and increment the ID byte pointer), fetch the decoded SW2 byte from the 10-8 decoder logic (if the "stop writing subdata blocks to SRAM 117" flag is clear, then write the byte to the SRAM 117 location pointed to by the ID byte pointer, and increment the ID byte pointer), fetch the decoded parity byte from the 10-8 decoder logic (if the "stop writing subdata blocks to SRAM 117" flag is clear, then write the byte to the SRAM 117 location pointed to by the ID byte pointer, and increment the ID byte pointer).

Then, fetch the decoded byte from the 10-8 decoder logic (if the "stop writing subdata blocks to SRAM 117" flag is clear, then write the byte to the SRAM 117 location pointed to by the block byte pointer and send the byte to the C1 syndrome generation circuits), increment the block byte pointer and repeat for 23 more bytes.

Then fetch the decoded byte from the 10-8 decoder logic, send the byte to the C1 syndrome generation circuits (if the "Enable on-the-fly C1 Generation" bit in the ECC control register is cleared and if the "stop writing subdata blocks to SRAM 117" flag is clear, then write the byte to the SRAM 117 location pointed to by the block byte pointer and increment the block byte pointer), repeat for 7 more bytes, if the eight syndrome bytes are not all zero. If the "Enable on-the-fly C1 Generation" bit in the ECC control register is cleared, do not perform the steps in this paragraph. If the "stop writing subdata blocks to SRAM 117" flag is clear, then write the syndrome bytes to the SRAM 117 location pointed to by the block byte pointer, incrementing the block byte pointer after each cycle. Write them in the following sequence: Even X3, even X2, even X1, even X0, odd X3, odd X2, odd X1, odd X0.

Repeat from point EEE three more times (2 blocks per pass; 8 blocks total precessed).

At this point, for the whole frame (both tracks), C1 ECC correction by microcontroller 105 must begin and C2 syndrome generation and correction must begin. Single byte C1 ECC errors should be corrected before C2 syndrome generation is started. The POST-AMBLE and MARGIN pattern comes in here using constant 1s pattern.

Software Sequence: DMA Transfer

When writing data to the tape, the data must first be read from the DRAM buffer manager's main buffer 104 and to one of the 8K byte from buffers in the SRAM 117. Data is always handled one frame at a time. When reading data from the tape, a frame of data is read into one of the frame buffers, ECC correction is applied to the data, and then the data is transferred to main data buffer 104.

Note that formatter 110 has no byte count so it does not automatically know when the transfer is complete. It will request transfers until disabled so the DRAM buffer manager 103 should only be programmed to transfer the exact number of data required in a frame. The typical sequence of commands for transferring the frame of data from main data buffer 104 to frame buffer 117 follows:

1. Set up the count in buffer manager 103 to transfer the 5756 bytes of user data. Note that the header is not included in this. Set up the address pointer in buffer manager 103 to point to the desired frame. Set up buffer manager 103 to send data. Enable buffer manager 103 to generate an interrupt when the transfer has finished.

2. Allow DRAM buffer manager 103 to respond to NFDREQ requests.

3. Write E4h to the DMA Control Register (0106h)
1xxx xxxx: enable interleaving
x1xx xxxx: enable randomizing
xx1x xxxx: slow down DMA requests
xxx0 xxxx: select DDS interleave mode, no header transferred
xxxx 0xxx: disable DMA request generation
xxxx x1xx: read from the DMA channel and write to SRAM 117
xxxx xxYY: YY=frame buffer to write to: 00 selects Frame Buffer 0

4. Write any value to the Initialize DMA Register at address 0103h to initialize the interleave counters, track checksum logic, and randomizing logic.

5. Write ECh to DMA Control Register 438 (0106h) to enable DMA xxxx 1xxx: enable DMA request generation 6. The data transfers now. This takes 4.3 milliseconds (103,610 clocks). Wait for an interrupt from DRAM buffer manager 103.

7. Read Interrupt Register (0113h). If DRAM buffer manager 103 request bit is set, then the transfer has completed and go to step 8. Otherwise, service the other interrupt source and go back to step 6.

8. Write E4h to DMA Control Register 438 (0106h) to disable DMA request generation.

9. Service DRAM buffer manager 103 to stop the interrupt request.

The typical sequence of commands for transferring the frame of data from frame buffer 117 to the main data buffer follows:

1. Set up the count in buffer manager 103 to transfer the 5756 bytes of user data. Note that the header is not included in this. Set up the address pointer in DRAM buffer manager 103 to point to the desired frame. Set up the buffer manager to receive data. Enable DRAM buffer manager 103 to generate an interrupt when the transfer has finished.

2. Allow DRAM buffer manager 103 to respond to NFDREQ requests.

3. Write E0h to the DMA Control Register 438 (0106h).
1xxx xxxx: enable interleaving
x1xx xxxx: enable randomizing
xx1x xxxx: slow down DMA requests
xxx0 xxxx: select DDS interleave mode, no header transferred
xxxx 0xxx: disable DMA request generation xxxx x0xx: read from the DMA channel and write to SRAM 117 xxxx xxYY: YY=frame buffer to write to: 00 selects Frame Buffer 0

4. Write any value to the Initialize DMA Register at address 0103h to initialize the interleave counters, track checksum logic, and randomizing logic.

5. Write E8h to the DMA Control Register 438 (0106h). xxxx 1xxx: enable DMA request generation.

6. The data transfers now. This takes 4.3 milliseconds (103,610 clocks). Wait for an interrupt.

7. Read Interrupt Register (0113h). If DRAM buffer manager 103 request bit is set, then the transfer has completed and go to step 8. Otherwise, service the other interrupt source and go back to step 6.

8. Write E0h to the DMA Control Register 438 (0106h) to disable DMA request generation.

9. Service DRAM buffer manager 103 to stop the interrupt request.

Software Sequence: Writing a Frame

This is the write sequence for a typical streaming write of frames. Special interrupts and conditions are not accounted for. The steps required to write a frame can be divided into two groups; those needed to process a frame, and those needed to send the frame through the serdes. When streaming writing, one frame will be going through the serdes while another is being processed.

The steps to process a frame are envisioned to start right after the Write+head starts its sweep of the tape and should complete before the Write+head comes around again. This way the processing time is a consistent 1 head revolution time (i.e. 23.52 milliseconds).

STEPS TO SEND A FRAME THROUGH THE SERDES

1. Bit 6 of the ECC Control Register 444 (010Bh) should already be set to enable C1 parity generation on the fly.

2. Wait for the Read+head to contact the tape. Allow time for the head to get into the subdata area.

3. Write 00h to Serdes Control Register 1 458 (010Dh) to select normal mode.

4. Write 40h to Serdes Control Register 0 457 (010Ch) to enable writing and use Frame Buffer 0 and Subdata Buffer 0 and track A and Even Frame Number.

5. Wait for the Write+head to contact the tape and allow time for writing of subcodes to start.

6. Set up for Read−head next if needed.

7. Wait for the Read−head to contact the tape and allow time for the head to get into the subdata area.

8. Write 44h to Serdes Control Register 0 457 (010Ch) to enable writing and use Frame Buffer 0 and Subdata Buffer 0 and track B and Even Frame Number.

9. Wait for the Write−head to contact the tape and allow time for writing of subcodes to start.

10. Set up for Read+head next if needed.

STEPS TO PROCESS A FRAME

1. Set up the DMA and transfer the data over into From Buffer 0 as described below in the DMA Sequence.

2. Put the four header bytes in SRAM 117.

DFID and Reserved byte at address "Buffer Start"+2h

LF-ID byte at address "Buffer Start"+0h

DFID and Reserved byte at address "Buffer Start"+1002h.

LF-ID byte at address "Buffer Start"+1000h

3. Write 50h to the ECC Control Register 444 (010Bh) to select C2 generation for Track A and allow C1 generation on the fly.

4. Write 70h to the ECC Control Register 444 (010Bh) to enable C2 generation for Track A and allow C1 generation on the fly.

5. Write any value to the Start ECC Register (0102h) to start the C2 generation.

6. Wait for 0.55 milliseconds (12720 clocks) or for the C2 Status bit in the ECC Control Register to be set. This allows the operation to complete.

7. Write 72h to the ECC Control Register 444 (010Bh) to enable C2 generation for Track B and allow C1 generation on the fly.

8. Write any value to the Start ECC Register (0102h) to start the C2 generation.

9. Wait for 0.55 milliseconds (12720 clocks) or for the C2 Status bit in the ECC Control Register to be set. This allows the operation to complete.

10. Write 50h to the ECC Control Register 444 (010Bh) to disable C2 generation and allow C1 generation on the fly. Leave select of C2 generation.

11. Xor the four header bytes into the generated track checksums.

Read the Track 1 Checksum Low Byte (0103h) and XOR with the DFID and Reserved byte. The result goes in the PC6 byte of Pack Item 3.

Read the Track 1 Checksum High Byte (0102h) and XOR with the LF-ID byte. The result goes in the PC5 byte of Pack Item 3.

Read the Track 2 Checksum Low Byte (0105h) and XOR with the DFID and Reserved byte. The result goes in the PC6 byte of Pack Item 4.

Read the Track 2 Checksum High Byte (0104h) and XOR with the LF-ID byte. The result goes in the PC5 byte of Pack Item 4.

12. Setup Subdata blocks in Subdata Buffer 0. Update the Subdata Pack items and generate new parity. Pack items 3 and 4 need the new Absolute Frame Count. Pack items 1 & 2 need to be updated when starting a new group.

Software Sequence: Read After Write

The hardware function for Read-After-Write is exactly the same as for Normal Read except that no main data is sent to SRAM 117, and, pointers to Bad C1 Block pairs are saved along with the actual syndrome bytes. Refer to the Bad C1 Block Counter Register 447 description above for details.

1. Set bit 6 of the ECC Control Register 444 (010Bh) to enable C1 syndrome generation on the fly. This should already be set up from the write.

2. Wait for the Write−head to contact the tape and wait until after it is in the first subdata area.

3. Write any value to the Read Track Checksum Register High Byte (0108h) to clear the Read Track Checksum.

4. Write any value to the Bad C1 Block Control Register 447 (0107h) to clear it.

5. Write 00h to Serdes Control Register 1 458 (010Dh) to select normal mode.

6. Write C2h to Serdes Control Register 0 457 (010Ch) to enable RAW on track A of buffer 2.

7. Wait sufficient time for the Read+head to complete its sweep of the tape.

8. Read Status Register 459 (010Eh) and test the Missing First Block Detected, bad Track Detected, and Non-Zero C1 Syndromes Detected bits.

9. Do checking of subdata.

10. Check the recalculated track checksum. Read the Read Track Checksum Register Low Byte (0109h) and the Read Track Checksum Register High Byte (0108h) and compare to the expected value. If there are any data errors, it will effect the checksums.

11. Read the Bad C1 Block Counter Register 447 (0107h). Save if needed for later. Clear if needed by writing any value to the Bad C1 Block Counter Register 447 (0107h). If it is 00h and the NonZero C1 Syndrome detected bit in Status Register 459 is clear, then no C1 ECC errors were detected. Otherwise, the syndromes must be checked to determine if single byte or multiple byte errors occurred.

12. Based on the above information, decide whether to rewrite the frame. If the decision is to not rewrite, then repeat steps 2–12 for the second track of the frame (write C6h to the Serdes Control Register while the Write+head is on the tape and after it has passed into the first subdata area).

13. If the decision is to rewrite, then rewriting with no frames wasted can be achieved if there is sufficient time to do the following before entering into the subdata area of the Write+head sweep of the next frame. If insufficient time, then complete the writing of the next frame and then rewrite the frame just checked.

The tasks to be done are:

1. Update the subdata pack items (absolute frame counts) and parities. This could be anytime after the frame is completely written out. It could be done while the first track is being read in.

2. Repoint the buffer in the Serdes Control Register 0 457.

Software Sequence: Reading a Frame

This is the read sequence for a typical read frame. It is assumed that the heads are tracking the frames on the tape. Special interrupts or exceptions are not accounted for. The steps required to read a frame can be divided into two groups: those needed to process a frame, and those needed to read the frame from the serdes. When streaming reading, one frame will be going through the serdes while another is being processed. The steps to process a frame are envisioned to take start right after the Read—head finishes its sweep of the tape and should complete before the next Read—head comes around. In this way the processing time is a consistent 1 head revolution time (i.e. 23.52 milliseconds).

STEPS TO READ A FRAME FROM THE SERDES

1. Set bit 6 of the ECC Control Register 444 (010Bh) to enable C1 syndrome generation on the fly.

2. Wait for the non used+head to contact the tape and wait until after it has passed into the first subdata area.

3. Write any value to the Read Track Checksum Register High Byte (0108h) to clear the Read Track Checksum Register 460.

4. Write any value to the Bad C1 block Counter Register 447 (0107h) to clear it.

5. Write 00h to Serdes Control Register 1 457 (010Ch) to enable Read on track A into buffer 0.

7. While the Read+head is on the tape and after it is in the first subdata area, write 00h to Serdes Control Register 0 457 (010Ch) to disable any activity on the next head sweep.

8. Wait a set amount of time for the track to be completely read while processing the previous frame.

9. Read the Read Track Checksum Low Byte (0109h) and the Read Track Checksum Low Byte (0108h) and save for checking later.

10. At some point while the non used—head is on the tape and after it is in the first subdata area, write 84h to Serdes Control Register 0 457 (010Ch) to enable Read on track B into buffer 0.

11. Write any value to the Read Track Checksum Register High Byte (0108h) to clear Read Track Checksum Register 460.

12. While the Read—head is on the tape and after it is in the first subdata area, write 00h to Serdes Control Register 0 457 (010Ch) to disable any activity on the next head sweep.

13. Wait a predetermined amount of time for the track to be completely read. While continuing to process the previous frame.

14. Read the Read Track Checksum Low Byte (0109h) and the Read Track Checksum Low Byte (0108h) and save for checking later.

STEPS TO PROCESS A FRAME

1. Look at the syndromes on the Subdata blocks to see if the data is reliable. If syndromes are bad, C1 correction could be done.

2. Check any Subdata Pack Item values that are necessary.

3. Do C1 ECC Correction on main data. Look at the C1 Bad Block Count stored in SRAM 117 to find out how many pairs of blocks had at least one set of non-zero C1 syndromes. Pointers to these blocks are in SRAM 117. Microcontroller 105 has to actually look at the 8 syndromes generated for each pair of blocks to determine which "block" had the error or if both "blocks" had errors. Single byte errors in a block are corrected. Blocks with multiple byte errors are called erasures and stored in a table for use when doing C2 ECC correction.

4. Select C2 syndrome generation over Track A of buffer 0 by writing 58h to ECC Control Register 444 (010Bh).

5. Enable the C2 syndrome generation over Track A of buffer 0 by writing 78h to ECC Control Register 444 (010Bh).

6. Write any value to the Start ECC Register (0102h) to start the C2 generation.

7. Poll for completion by reading Interrupt Register 415 (0113h) waiting for the C2 Status bit to be set.

8. If the C2 Status bit is set and the Non-Zero ECC Syndromes bit is set, then go to step 9. Otherwise, if the ECC Interrupt is set and the non-zero ECC Syndromes bit is clear, then go to step 11.

9. Clear the C2 Status bit by reading C2 Block Address 446 (010Ah). It points to the starting byte address of the block which had the non-zero syndromes. Look at the syndromes.

10. Calculate the correction using the syndromes and any erasures from C1. XOR the correction into the appropriate bytes of the block. Restart by going to step 6.

11. Clear the C2 Status bit by reading the ECC Block Address (010Ah).

12. Enable the C2 syndrome generation over Track B of buffer 0 by writing 7Ah to ECC Control Register 444 (010Bh).

13. Write any value to the Start ECC Register (0102h) to start the C2 generation.

14. Poll for completion by reading Interrupt Register 413 (0113h) waiting for the C2 Status bit to be set.

15. If the C2 Status bit is set and the Non-Zero ECC Syndromes bit is set, then to step 16. Otherwise, if the ECC Interrupt is set and the Non-Zero ECC Syndromes bit is clear, then go to step 18.

16. Clear the C2 Status bit by reading the ECC Block Address (010Ah). It points to the starting byte address of the block which had the non-zero syndromes. Look at the syndromes.

17. Calculate the correction using the syndromes and any erasures from C1. XOR the correction into the appropriate bytes of the block. Restart by going to step 13.

18. Clear the C2 Status bit by reading the ECC Block Address (010Ah).

19. Do any checking of the four header bytes.

20. Set up the DMA and transfer the data over from Frame Buffer 0 as described below in the DMA Sequence.

21. Recheck track checksums if needed.

Note that the Read Track Checksums are also available for additional checking. However, to be useful, all ECC corrections which do not cover the C2 parity blocks must be applied to them.

Search

During SEARCH, subdata blocks are attempted to be read. Microcontroller 105 will generate windows during which blocks will be searched. When the FMTT1 signal is high, the window is considered open. When low, the window is closed. These windows will cover only the subdata areas so distinguishing subdata blocks from main data blocks is not a problem. Whenever the window is open, blocks will be searched for. Nothing prevents microcontroller 105 from opening the windows while all four heads sweep the tape, thereby obtaining the maximum block sample rate possible. Sync detect will determine the start of a block. Once a block starts transferring to SRAM 117, the whole 32 bytes of the block will be transferred independent of the state of the FMTT1 signal.

All blocks will be written to the selected track portion of frame buffer 117 pointed to by the Buffer Selection and Track A/B bits in the Serdes Control Register 0 457 starting at offset 0 in the buffer. Data will be transferred into the buffer as long as the window defined by the FMTT1 signal is active. If a block transfer is in progress when the FMTT1 signal goes inactive, the block will finish transferring. The Block counter Register (0111h) will point to the next block in SRAM 117 to fill. In other words, it will be equal to the number of blocks read. The Block Counter Register will roll over to 0 after 128 blocks are read and will increment up from there (overwriting previously read blocks) provided microcontroller 105 does not reset it. Microcontroller 105 will be able to reset the Block Counter when in search mode by writing any value to it. No C1 syndrome generation will be attempted on the blocks read in. The C1 parity bytes will be written to memory as they were read from tape.

Appending

During appending, the system is in search mode at 1X speed with ATF working and frames are being read to keep track of location and to be able to switch over to writing frames. Two frames of data should be in SRAM 117 ready to write out. The third frame buffer should be used for the subdata blocks read while in search mode. Microcontroller 105 must know what frame it is looking for, or sequence of frames (if frames have been rewritten) in order to know when to switch off search mode and go into write mode. Also, when switching to write mode, the ATF tracking must be turned off and we run open loop. Note that the absolute frame count must be contiguous (last data to save=n, next previously written frame=n+1, new frame =n+2); the new frame is an amble frame. According to the spec, a minimum of 2 amble frames will be written before starting to write data for a seamless append.

Software Sequence: Diagnostic Read

Diagnostic Read works just like regular read from tape except the raw code comes from the main buffer instead of from tape. When in diagnostic read mode, no DMA needs to be enabled in the formatter 110. DMA will be enabled automatically. The Read Clock from data separator 118 is not used, the write clock (crystal) is used if the Enable SERDES Clock bit of the SERDES Control Register 1 458 is clear. If the Enable SERDES Clock bit of the SERDES Control Register 1 458 is set, microcontroller 105 must clock each bit by writing any value to the Bit Pointer Register. Raw code is read from the main buffer, serialized, deserialized, decoded, and sent to SRAM 117. If C1 on the fly is enabled, then syndrome bytes will be calculated and written to SRAM 117 also.

It is assumed that a whole track of data will be read from main data buffer 104. No special control logic is added to sequence 406 in order to be able to send only part of a track. Sequence 406 does not look for the ATF areas, so those areas do not need to be sent. If the serdes is idle, the read will start when Serdes Control Register 0 457 is set up for Diagnostic Read and the synchronized changing edge of the TRKCLK signal is detected. IF the serdes is not idle, the read will start when Serdes Control Register 0 457 is written to set it up for Diagnostic Read (8820 bytes are in a raw track).

There are some special track status bits which are useful during diagnostic read. Sync Detected and Code Violation Detected in the Status register can be used along with the Stop on Code Violation and Stop on Sync Detect in Serdes Control Register 1 458 to help microcontroller 105 determine where structures or errors are in the raw code. By enabling the Stop on Sync Detect, the Sync Detected bit can be polled to determine when a sync was detected. Then microcontroller 105 can look at how many bites were transferred by buffer manager 103 and the bit counter to determine exactly where the sync is located in the raw code in the main buffer.

Software Sequence: Diagnostic Write

Diagnostic, Write works just like regular write to tape except the raw code goes to main data buffer 104 instead of to the tape. When in diagnostic write mode, no DMA needs to be enabled in formatter 110. DMA will be enabled automatically. A track of data is read from SRAM 117, encoded, ATF and subcode generated, serialized, deserialized into 8 bit bytes, and DMAed over to the main buffer. If C1 on the fly is enabled, then parity bytes will be generated also. A whole track of data is always sent to main data buffer 104. The write will start when the Serdes Control Register 0 457 is set up for Diagnostic Write and the synchronized changing edge of the TRKCLK signal is detected (8820 bytes are in a raw track).

Software Sequence: Read Raw Code

Read data from the tape and deserialize and DMA over to DRAM buffer manager 103. Set up is similar to appending. When the track before the track of interest is read, wait for the right head to come around and turn on read raw code and DMA each track of data to DRAM buffer manager 103. DMA is turned on automatically when the mode is set to Read Raw Code. After microcontroller 105 has "fixed" the data, use diagnostic read to decode the data.

Note that at 12.0M bits/sec, this is 1.5M bytes/sec over DMA channel 132 to main data buffer 104. With +3% tape speed, the data rate is 1.54M bytes/sec.

Software Sequence: Write Raw Code

Set up the frame's worth of data to write in the main buffer. Set up the formatter 110 just as in appending. When the track before the track of interest is read, wait for the right head to come around and turn on write raw code and DMA each track of data from the buffer manager to tape. DMA is turned on automatically when the mode is set to Write Raw Code.

Note that at 12.0M bits/sec, this is 1.5M bytes/sec over DMA channel 132 to main data buffer 104. With +3% tape speed, the data rate is 1.545M bytes/sec.

Handling Missing Syncs

On a tape, it is likely that a defect will occur such that it affects a sync mark at the start of a block. Formatter 110 has several features which help in the detection of and recovery from such an event. Information is stored in several locations to aid the software in its recovery algorithm.

The ID bytes (W1, W2, Parity) from the first eight main data blocks read in from a track are stored in SRAM 117 for later analysis. By looking at the block number in W2, it can be determined whether any blocks were missed at the start of the main data area.

Status Register 416 has two bits which provide additional information. The "Started Main Data on Block 1" bit is set when the hardware detects what it thinks is the first sync mark of the main data area and the ID bytes indicate that it is block 1 (the ID parity check must be good to set to set this bit). When the hardware detects this specific condition, it will not store the data from the block at the start of the track buffer but will increment the address pointer to point to where block 1 should go in SRAM 117 and store it there. If all the other blocks come in as expected, then C2 ECC can be used to correct block 0 being missed.

The second Status Register bit is "Sync Missed". When a sync mark is detected, the hardware will read in that block and expect the next sync mark to occur at its ideal position ±1 bit time. The hardware resyncs its bit counter when it detects the sync mark. If the sync is not detected within this window, then the "Sync Missed" bit is set, and the hardware pretends a sync occurred and transfers the next block to SRAM 117. The hardware will then detect the sync mark of the next block and get back in sync with the data.

PLL Algorithm

The circuit which controls RDGATE and FLOCK generation is reset when not in Normal Read or Read After Write mode, when the synchronized changing edge of the TRKCLK signal occurs, at the end of a data or subdata area, and by NRESET being low. The reset state is with RDGATE low and FLOCK low and the "ONES COUNTER" cleared.

In Search Mode, FLOCK and RDGATE normally are low. They go high when FMTT1 goes high (the search window is open). FLOCK and RDGATE remain high as long as FMTT1 is high. They also will remain high for up to one block after FMTT1 goes low. This allows the last block started to finish transferring to SRAM 117.

In Normal Read, Read After Write, after reset, the circuitry counts the number of falling edges on the RAWCOD signal which occur in a 2 "byte" period (20 clocks of the RDCLK signal). If 17 or more transitions occur in this period, then RDGATE goes high and four "byte" periods later FLOCK goes high. Once high, RDGATE and FLOCK remain high until the circuitry is reset. If, during the 2 "byte" period, fewer then 17 transitions occur, then the counter is cleared and counts for another 2 byte period and repeats the test.

TEST MODES

Formatter 110 provides test modes and features including ATE tri-state, ATE activity, and processor diagnostics hooks.

ATE Tri-state

Grounding the/TRIS pin causes formatter 110 to tri-state all of its pins. This facilitates in-circuit ATE test of other components on the board with formatter 110, since the ATE equipment does not need to overdrive any signals from formatter 110.

The/TRIS pin has a small internal pullup. It should be connected to a test point on the pcb for easy ATE access.

ATE Activity

Grounding the/ACTI pin, when the/TRIS pin is high, causes formatter 110 to connect all its output pins directly to input pins. This allows ATE equipment to easily verify that the correct part is on the board in the proper orientation, and that all the pins make contact with their pads. The ATE equipment does this by applying stimulus to the input pins (overdriving the normal input sources, if necessary) and looking for the appropriate changes on each of the output pins. The/ACTI pin has a small internal pullup. It should be connected to a test point on the pcb for easy ATE access. The pin mapping for the Activity test mode is shown in Appendix VI.

Processor diagnostics hooks

To facilitate diagnostics of formatter 110 by firmware running in microcontroller 105 processor, the following diagnostics hooks are provided:

1. All of the registers which are writable may also be read back. In most cases, microcontroller 105 should be able to read back the same data that was written.

2. Readback is provided for some buried registers (for which reading is not required for normal operation).

3. A loop-back port is provided for diagnosing the serial prot.

4. Diagnostic Read and Diagnostic Write together provide a loop-back capability for testing the SERDES.

Signal Descriptions

All bidirectional and input pins have pullup resistors.

Processor/System Signals

AD[0.7] BI-Multiplexed Address and Data bus from microcontroller 105.

A[8 . . 15] IN-High order Address lines from microcontroller 105.

INST IN-Signal from microcontroller 105 indicating code (instruction) space access.

LA[0. . 7] OUT-Low order address lines latched from the AD[0 . .7] lines

ALE IN-Address Latch Enable. This signal indicates when valid data is present on the multiplexed address and data bus.

NRD IN-Read signal from microcontroller 105.

NWR IN-Write signal from microcontroller 105.

RDY OUT-Ready signal to microcontroller 105 indicating that the active bus cycle can complete.

When inactive, microcontroller 105 adds wait states to the current bus cycle.

FMTT1 IN-A high speed output from microcontroller 105 which during Raw Code and Diagnostics is high when formatter 110 should transfer data to buffer manager 103. During Search Mode is high when subdata block should be looked for.

TRKCLK IN-An active high, high speed output from microcontroller 105 which indicates when head switching should occur. The changing edge of the signal indicates the start of a head sweep across the tape. The signal will have a nominal 50% duty cycle.

NRESET IN-The reset signal from the system.

FINT OUT-An active high interrupt signal to microcontroller 105. It can be activated by not only select formatter 110 conditions but also the external interrupt signals.

NROMOE OUT-An active low signal enabling ROM 107 to drive the multiplexed address and data bus.

SL0 BI-Inputs for SCSI address selection. When selected as outputs by setting the TEST OUT bit in the SERDES Control Register 1 458; SLO supplies the SERDES RAM cycle signal for debug purposes, SL1, supplies the ECC RAM cycle signal for debut purposes, SL2 supplies the DMA RAM cycle signal for debug purposes.

SL1

SL2

SCLOCK IN-The clock signal which runs formatter 110. This input can be used with the XTAL OUT pin and a crystal to run formatter 110 if need be. For DDS Compliance, the clock should run at a frequency of 18.815855 MHz.

XOUT OUT-The output signal which drives a crystal. The signal at this output should be the inversion of the SCLOCK signal.

SDAT BI-Serial Port data bus.

NTRIS IN-Input telling all output pins to go into high impedance mode.

NACTI IN-Input telling all inputs to connect to outputs.

Buffer Manager/SCSI Controller Signals

FD[0..7] BI-DMA channel data bus.

NFDREQ OUT-An active low signal requesting a DMA transfer.

NFDACK INPU-An active low signal indicating a transfer is in progress.

NSTAC OUT-An active low signal indicating the STAC DRAM buffer manager's address space has been decoded from microcontroller 105 memory space.

NSCSI OUT-An active low signal indicating the SCSI controller's address space has been decoded from microcontroller 105 memory space.

NCSDC OUT-An active low signal indicating the data compression chip's address space has been decoded from microcontroller 105's memory space.

NIRQ INPU-An active low input indicating an interrupt request from the STAC buffer manager 103.

SCSINT INPU-An active high input indicating an interrupt request from the SCSI controller 102.

NWAIT IN-An active low input indicating 1) buffer manager 103 is not ready to complete the current cycle to SCSI Controller 102 or itself or 2) indicating the data compression chip is not ready to complete the current cycle to itself. During buffer manager 103 and SCSI and data compression chip accesses, if this signal is active, the READY signal goes inactive.

SRAM 117 signals

RA[0..4] OUT Address lines for SRAM 117.

RD[0..7] BI -Data bus for SRAM 117

NRWR OUT-Write pulse for SRAM 117

NRRD OUT-Read pulse for SRAM 117

Read/Write Channel 133 Signals

WDAT OUT-Serialized encoded data to write channel 133. When a 1 is to be written, a high going pulse is generated. The pulse width is equal to half of the codebit timing.

REFCLK OUT-Reference clock for WRDAT and data separator 118. It runs at the data bit clock (half of the SCLOCK rate) and is referenced to SCLOCK.

RAWCOD IN-Raw code from read channel 133. Used for Pre-Amble detect (all ones pattern).

RDAT IN-Serial data from data separator 118.

RDCLK IN-Data clock from data separator 118.

RDGATE OUT-Signal to the read channel 133 and data separator 118 which is active during reading. It tells data separator 118 to track the data stream instead of the reference clock 118

FLOCK OUT-Signal to data separator 118 telling it whether to lock to the frequency or lock to the phase. When locking to the frequency, data separator 118 can change quickly, when locking to phase, it changes slowly.

NWRGAT OUT-An active low signal to write channel 133 indicating writing is currently in progress.

NPILOT OUT-An active low signal indicating the pilot signal is currently being written.

The preferred embodiment of formatter 110 is presented in Microfiche Appendix A containing a pin out diagram and a series of 90 gate level logic schematic diagrams representing approximately 12,000 logic gates. The figures in Microfiche Appendix A present an example of how the above-described functions, registers, resources, sequences, and test modes may be implemented in hardware.

In conventional systems, functions performed by the two-chip system comprising formatter 110 and frame buffer 117 were performed by 4 to 10 chips. The present invention reduces parts count, costs, complexity, and increases reliability. It will be appreciated by those skilled in the electronic arts that an alternate embodiment integrating frame buffer 117 with formatter 110 produces a single chip formatter, even further reducing parts, costs, complexity, and increasing reliability.

In summary, the advantages of the present invention include a significant reduction in parts count, costs, and electronic complexity and subsequent increased reliability over the prior art. Further, the invention achieves a reduction in RAM requirements, higher data transfer rates using an independent oscillator, on-the-fly error correction, a faster parallel functioning randomizer/derandomizer, provision for reading tracks with missing sync marks at the beginning of its main data field using only simple C2 error correction. Still further, in RAW operation, a bad frame may be re-written with only one intervening frames as contrasted with prior art systems requiring two to five intervening frames which wasted tape space, an independent track checksum unit acts on RAW data which allows more stringent RAW criteria resulting in higher data integrity.

An embodiment of this invention can be found in Digital Data Tape Storage System Model RB100 manufactured by R-Byte of San Jose, Calif.

While the above description provides a full and complete description of the preferred embodiments of the present invention, various modifications, alternate constructions, and equivalents may be employed while still remaining within the scope of the invention. For example, although the preferred embodiment described was a 1.0 micron CMOS gate array ASIC, other technologies may be advantageously implemented to reach the objectives of the present invention. These include standard cells, full custom integrated circuits, high-density programmable logic, and other implementation technologies known to those skilled in the electronic arts. Other functions may also be included on the formatter chip including a frame buffer, a main data buffer manager, a microcontroller, ATF logic, and an interface unit. Therefore, the above description and illustrations should not be construed as limiting the scope of the invention which is defined by the following claims.

APPENDIX I

Register MAP
R=Read Only, RW=Read/Write

| | | |
|---|---|---|
| 00 | Not used | |
| 01 | SCSI Select Input Register | R |
| 02 | Track 1 Checksum High Byte | R |
| 02 | Start ECC | W |
| 03 | Track 1 Checksum Low Byte | R |
| 03 | Initialize DMA | W |
| 04 | Track 2 Checksum High Byte | R |
| 05 | Track 2 Checksum Low Byte | R |
| 05 | Clear Arbitration Error | W |
| 06 | DMA Control Register | RW |
| 07 | Bad C1 Block Counter Register | RW |
| 08 | Read Track Checksum High Byte | RW |
| 09 | Read Track Checksum Low Byte | R |
| 0A | C2 Block Address | R |
| 0B | ECC Control Register | RW |
| 0C | Serdes Control Register 0 | RW |
| 0D | Serdes Control Register 1 | RW |
| 0E | Status Register | RW |
| 0F | Bit Pointer | RW |
| 10 | Byte Counter | R |
| 11 | Block Counter | RW |
| 12 | State Sequence | R |
| 13 | Interrupt Register | RW |
| 14 | Serial Port Address/Status Register | RW |
| 15 | Serial Port Data Register | RW |
| 16 | Galois Multiplier Value 1 | RW |
| 17 | Galois Multiplier Value 2 | RW |
| 18 | Galois Multiplier Result | R |
| 19 | Galois Square Root | R |

APPENDIX II

| Symbol | Description | MIN | MAX | Units |
|---|---|---|---|---|
| t1 | Address Valid to NRRD Active | tcyc−3.3 | | ns |
| t2 | NRRD Inactive to Address Change | 2.2 | | ns |
| t3 | Data Valid to NRRD Inactive | 32.1 | | ns |
| t4 | Data hold from NRRD Inactive | 0 | | ns |
| t5 | Address Valid to NRWR Active | 1/2tcyc−3.3 | | ns |
| t6 | NRWR Inactive to Address Change | 1/2tcyc+4.4 | | ns |
| t7 | Data Valid to NRWR Inactive | 1/2tcyc−30.7 | | ns |
| t8 | Data Hold from NRWR Inactive | 1/2tcyc+3.3 | | ns |
| t9 | NRRD pulse width | 2tcyc−1.7 | | ns |

APPENDIX II-continued

| Symbol | Description | MIN | MAX | Units |
|---|---|---|---|---|
| t10 | NRWR pulse width | 2tcyc−1.5 | | ns |

APPENDIX III

| Symbol | Description | Min | MAX | Units |
|---|---|---|---|---|
| t1 | Address Valid to NSTAC Active | | 27.5 | ns |
| t2 | Address change to NSTAC inactive | 8.2 | | ns |
| t3 | Address Valid to NSCSI Active | | 26.3 | ns |
| t4 | Address Change to NSCSI Inactive | 10.0 | | ns |
| t5 | Address Valid to NSCDC Active | | 29.9 | ns |
| t6 | Address Change to NCSDC Inactive | 8.4 | | ns |
| t7 | NWAIT Active to RDY Inactive | | 18.1 | ns |
| t8 | NWAIT Inactive to RDY Active | | 16.2 | ns |
| t9 | Address Valid to RDY (NSCSI cycle) | | 29.6 | ns |
| t10 | NWAIT Inactive to RDY (NSCSI cycle) | 4tcyc | 5tcyc+25.2 | ns |
| t11 | RDY Inactive (NSCSI cycle) | 4tcyc | | ns |
| t12 | Address Valid to RDY (NCSDC cycle) | | 33.0 | ns |
| t13 | RDY Inactive (NCSDC cycle) | 5tcyc | | ns |
| t14 | ALE Inactive to NROMOE Active | | 18.0 | ns |
| t15 | ALE active to NROMOE InActive | | 16.1 | ns |

APPENDIX IV

| CODE SPACE | |
|---|---|
| 0000 | Processor internal registers |
| 00FF | |
| 0100 | Formatter ASIC |
| 013F | 25 registers |
| 0140 | SCSI controller |
| 017F | 8 registers |
| 0180 | DRAM Buffer Manager |
| 01BF | 32 registers |
| 01C0 | Data Compression Chip |
| 01FF | 32 registers |
| 0200 | ROM |
| FFFF | 63.5K bytes |
| DATA SPACE | |
| 0000 | Processor internal registers |
| 00FF | |
| 0100 | Formatter ASIC |
| 013F | 25 registers |
| 0140 | SCSI controller |
| 017F | 8 registers |
| 0180 | Buffer Manager |
| 01FF | 64 registers |
| 0200 | ROM |
| 7FFF | 31.5K bytes |
| 8000 | SRAM |
| FFFF | 32K bytes |

APPENDIX V

| | |
|---|---|
| 8000 | Frame Buffer 0 - Track A(+) |
| 8fFF | |
| 9000 | Frame Buffer 0 - Track B(−) |
| 9FFF | |
| A000 | Frame Buffer 1 - Track A(+) |
| AFFF | |
| B000 | Frame Buffer 1 - Track B(−) |
| BFFF | |
| C000 | Frame Buffer 2 - Track A(+) |
| CFFF | |

APPENDIX V-continued

| Address | Description | | |
|---|---|---|---|
| D000 DFFF | Frame Buffer 2 - Track B(−) | | |
| E000 FFFF | Processor and FORMATTER ASIC Scratch Area | | |
| SRAM address E000h | | | |
| E000 E03F | Buffer 0 - Subdata write data | 2 Blocks | W |
| E040 E07F | | | |
| E080 E087 | Buffer 0 - W1 eight block cycle | | W |
| E088 E097 | | | |
| E098 | Buffer 0 - SW1 for even blocks | | W |
| E099 | Buffer 0 - SW2 for even blocks | | W |
| E09A | Buffer 0 - SW1 for odd blocks | | W |
| E09B | Buffer 0 - SW2 for odd blocks | | W |
| E09C-E0BF | | | |
| E0C0 E0D7 | Buffer 0 - ID Entry for Main data blocks - Track A (+) | 8 entries | R |
| E0D8 E0DD | Buffer 0 - ID Entry for Subdata blocks - Track A (+) | 2 entries | R |
| E0DE-E0DF | | | |
| E0E0 E0F7 | Buffer 0 - ID Entry for Main data blocks - Track B (−) | 8 entries | R |
| E0F8 E0FD | Buffer 0 - ID Entry for Subdata blocks - Track B (−) | 2 entries | R |
| E0FE-E0FF | | | |
| E100 E13F | Buffer 0 - Subdata read data - Track A(+) | 2 blocks | R |
| E140 E17F | Buffer 0 - Subdata read data - Track B(−) | 2 blocks | R |
| E180 E1FF | Buffer 0 - Bad C1 Block Pointers/RAW Syndromes | | R |
| SRAM address E200h | | | |
| E200 E23F | Buffer 1 - Subdata write data | 2 Blocks | W |
| E240 E27F | | | |
| E280 E287 | Buffer 1 - W1 eight block cycle | | W |
| E288 E297 | | | |
| E298 | Buffer 1 - SW1 for even blocks | | W |
| E299 | Buffer 1 - SW2 for even blocks | | W |
| E29A | Buffer 1 - SW1 for odd blocks | | W |
| E29B | Buffer 1 - SW2 for odd blocks | | W |
| E29C-E2BF | | | |
| E2C0 E2D7 | Buffer 1 - ID Entry for Main data blocks - Track A(+) | 8 entries | R |
| E2D8 E0DD | Buffer 1 - ID Entry for Subdata blocks - Track A(+) | 2 entries | R |
| E2DE-E2DF | | | |
| E2E0 E0F7 | Buffer 1 - ID Entry for Main data blocks - Track B(−) | 8 entries | R |
| E2F8 E2FD | Buffer 1 - ID Entry for Subdata blocks - Track B(−) | 2 entries | R |
| E2FE-E2FF | | | |
| E300 E33F | Buffer 1 - Subdata read data - Track A(+) | 2 blocks | R |
| E340 E37F | Buffer 1 - Subdata read data - Track B(−) | 2 blocks | R |
| E380 E1FF | Buffer 1 - Bad C1 Block Pointers/RAW Syndromes | | R |
| SRAM address E400 | | | |
| E400 E43F | Buffer 2 - Subdata write data | 2 Blocks | W |
| E440 E47F | | | |
| E480 E487 | Buffer 2 - W1 eight block cycle | | W |
| E488 E497 | | | |
| E498 | Buffer 2 - SW1 for even blocks | | W |
| E499 | Buffer 2 - SW2 for even blocks | | W |
| E49A | Buffer 2 - SW1 for odd blocks | | W |
| E49B | Buffer 2 - SW2 for odd blocks | | W |
| E49C-E4BF | | | |
| E4C0 E0D7 | Buffer 2 - ID Entry for Main data blocks - Track A(+) | 8 entries | R |
| E4D8 E4DD | Buffer 2 - ID Entry for Subdata blocks - Track A(+) | 2 entries | R |
| E4DE-E4DF | | | |
| E4E0 E4F7 | Buffer 2 - ID Entry for Main data blocks - Track B(−) | 8 entries | R |
| E4F8 E4FD | Buffer 2 - ID Entry for Subdata blocks - Track B(−) | 2 entries | R |
| E4FE-E4FF | | | |
| E500 E53F | Buffer 2 - Subdata read data - Track A(+) | 2 blocks | R |
| E540 E57F | Buffer 2 - Subdata read data - Track B(−) | 2 blocks | R |
| E580 E5FF | Buffer 2 - Bad C1 Block Pointers/RAW Syndromes | | R |

APPENDIX VI

| INPUT PIN tied to OUTPUT PIN | | INPUT PIN tied to OUTPUT PIN | |
|---|---|---|---|
| A15(91) | AD0(7) | FD6(54) | RA0(48) |
| A14(92) | AD1(6) | FDS(55) | RA1(47) |
| A13(93) | AD2(5) | FD4(56) | RA2(46) |
| A12(94) | AD3(4) | FD3(57) | RA3(45) |
| A11(95) | AD4(2) | FD2(58) | RA4(44) |
| A10(96) | AD5(l) | FD1(59) | RA5(43) |
| A9(97) | AD7(99) | FD0(60) | RA6(42) |
| A8(98) | AD6(100) | RD7(52) | RA7(41) |
| NRESET(72) | LA0(74) | RD6(25) | RA8(39) |
| SCSINT(73) | LA1(75) | RDS(26) | RA9(38) |
| NRESET(72) | LA2(76) | RD4(27) | RA10(37) |
| INST(89) | LA3(77) | RD3(29) | RA11(36) |
| NRD*(87) | LA4(79) | RD2(30) | RA12(35) |
| NWR*(85) | LA5(80) | RD1(31) | RA13(34) |
| FMTT1(83) | LA6(81) | RD0(32) | RA14(33) |
| TRKCLK(84) | LA7(82) | FD7(52) | NRWR(51) |
| NIRQ(67) | NSTAC(61) | FD6(54) | MRRD(50) |
| NFDACK(64) | NSCSI(62) | FD7(52) | NCSDC(49) |
| NWAIT(66) | NFDREQ(63) | NRESET(72) | NROMOE(70) |
| SCSINT(73) | FINT(71) | ALE(88) | RDY(86) |
| RAWCOD(12) | NWRGAT(14) | SL1(9) | NPILOT(15) |
| SL2(8) | REFCLK(17) | RDAT(20) | FLOCK(18) |
| RDCLK(19) | RDGATE(21) | SL0(10) | WDAT(13) |
| RDCLK(19) | SDAT(23) | | |

*These signals are inverted before being driven out.

What is claimed is:

1. A formatter write device for a digital data storage system, said digital data storage system having a data bus, a main buffer, a frame buffer, a frame buffer bus, a microcontroller, and a head drum in communication with magnetic tape comprising:
   randomizer means for randomizing data, said randomizer means coupled to the data bus;
   track checksum means for computing a running track checksum, said track checksum means coupled to said randomizer means;
   data interleaving means for interleaving data, said data interleaving means coupled to said track checksum means;
   arbiter means for arbiting access to the frame buffer, said arbiter means coupled to frame buffer;
   C2 parity byte computing means for generating C2 parity bytes, said C2 parity byte computing means coupled to said interleaving means and said arbiter means;
   C1 parity byte computing means for generating C1 parity bytes, said C1 parity byte computing means coupled to the frame buffer bus;
   8-10 conversion means for performing 8-10 coding conversion of data, said 8-10 conversion means coupled to the frame buffer bus;
   track format data generating means for generating track format data and for synchronizing data writing with the head drum means, said track format data generating means coupled to the frame buffer bus and to the head drum; and status register means for registering the status of a write operation, said status register means coupled to the microcontroller and to the frame buffer bus.

2. The formatter write device of claim 1 wherein said randomizer means is parallel-functional.

3. The formatter write device of claim 1 wherein said randomizer means performs randomization on the fly during data transfers from the main buffer to the frame buffer.

4. The formatter write device of claim 1 wherein said interleaving means performs interleaving on the fly during data transfers from the main buffer to the frame buffer.

5. The formatter write devices of claim 1 wherein said C1 parity byte computing means computers C1 parity bytes on the fly during data transfers from the frame buffer to the tape.

6. The formatter write device of claim 1 wherein said data is in DDS standard format.

7. A formatter read device for a digital data storage system (DDS), said DDS system having a frame buffer, a microcontroller, and read/write channel coupled to a data separator comprising:

deserializer means for converting serial data from magnetic tape to parallel, said deserializer means coupled to the data separator;

8–10 decoder means for decoding said data, said 8–10 decoder means coupled to said deserializer means;

track checksum means for performing track checksum on said data, said track checksum means coupled to said decoder 8–10 means;

C1 syndrome generator means for computing C1 syndromes on the fly and for writing both data and syndromes into the frame buffer, said C1 syndrome generator means coupled to said track checksum means;

frame buffer manager means for managing data transmitted to the frame buffer, said frame buffer manager means coupled to said C1 syndrome generator means;

arbiter means for arbiting access to the frame buffer, said arbiter means coupled to said frame buffer manager means; and C2 error correction coding means for generating C2 error correction code, said C2 error correction coding means coupled to said frame buffer manager means and to said arbiter means.

8. The formatter read device of claim 7 wherein said track checksum means is independent from amy write operation track checksum.

9. In a digital data storage audio tape system having a host device interface unit that is coupled to a main data buffer manager, the main data buffer manager coupled to a main data buffer means, the digital data storage audio tape system further including a processor means, a tape drive unit, a read/ write channel, and a DMA channel bus, a formatter comprising:

formatter interface means for interfacing the processor means, said formatter interface means coupled between said processor means and an internal processor bus;

formatter sequencer means for sequencing data and data operations, said formatter sequencer means coupled to said internal processor bus and to the read/write channel;

formatter buffer manager means for buffering data between said formatter interface means and said formatter sequencer means, said formatter buffer manager means coupled to said formatter sequencer means by an internal read/write bus and to said internal processor bus, and further coupled to the DMA channel bus;

said formatter interface means including an address map decoder, ready logic, interrupt control, serial port handshake logic, and a plurality of registers including an interrupt, a serial port address/status, a serial port data, a Galois field value 1, a Galois field value 2, a Galois field result, a Galois square root, and a jumper input;

said formatter sequencer means including a C1 parity generator, a C1 syndrome generator, a read/write sequencer, an encoder/decoder, an automatic track finding (ATF) pattern generator, and an ID parity, and a plurality of registers including a serial/deserializer (serdes) control 0, a serdes control 1, a status, two read track checksum, and a bit pointer, a state counter, a block counter, and a byte counter; and said formatter buffer manager means including a C2 parity generator, a C2 syndrome generator, a data path control, a buffer address generator, a direct memory access (DMA) arbitrator, a DMA handshake, and a randomizer, and a plurality of registers including a DMA controller control, SRAM access latch, two track 1 checksum, two track 2 checksum, an ECC control, a control pulse, a C2 block address, and a bad C1 block count.

10. The formatter of claim 9 further comprising tri-state and activity modes means for automatic test equipment testing.

11. In a digital data storage magnetic tape system for transmitting data between a host device and a tape drive unit, the system including a formatter coupled to a frame buffer having at least one buffer pointer, and a processor, a method for read-after-write checking to determine whether a track was successful written, comprising the steps of:

(a) multiple buffering the frame buffer wherein the processor stores a copy of the frame which is being read-after-write checked while simultaneously processing new frames for writing; and (b) immediately rewriting an improperly written frame by changing the buffer pointer in the frame buffer and updating relevant sub data areas under instruction control of said processor.

12. In a digital data storage magnetic tape system for transmitting data between a host device and a tape drive unit having a read channel and a frame buffer, the data being accessed and encoded and decoded on a per frame and per track basis, and the data being in a main data area and subject to C1 error correction code, read track checksum, a method for read-after-write (RAW) checking comprising the steps of:

re-writing a frame when more than a predetermined number of blocks in any area of either track of the frame have C1 syndromes indicating an error;

calculating read track checksums as the data is transferred from the read channel to the frame buffer; and re-writing the frame when a track checksum discrepancy is found, thereby achieving re-writing of a bad frame after only one intervening frame.

13. The RAW checking method of claim 12 further comprising the steps of:

re-computing the track checksums during the main data area read;

comparing the track checksums with a stored value having been written for that track; and comparing the track checksum to the value read back from one good subdata block pair, thereby avoiding drop-ins in the main data area of the frame.

14. The RAW checking method of claim 13 wherein said track checksum checking acts on RAW data, thereby allowing more stringent RAW criteria resulting in higher data integrity.

15. A method of formatting data comprising the operational steps of:
   interleaving;
   randomizing;
   C1/C2 ECC generation;
   subdata block processing;
   sync generation;
   automatic track finding signal generation;
   deinterleaving; and
   derandomizing.

16. A method of formatting data comprising the operational steps of:
   (a) assembling data in a main data buffer on a data group basis under the instruction control of a formatter and a processor;
   (b) generating relevant system data including group number, filemark, save set marks for the data group in the main data buffer means by the processor;
   (c) transferring the data group responsive to instruction control by the processor to a frame buffer means;
   (d) moving system data for the single frame to the frame buffer means under the instruction control of the processor;
   (e) computing C2 parity bytes with the formatter;
   (f) writing to the frame buffer on a frame basis with the formatter;
   (g) reading data from the frame buffer, and before outputting the serial data stream:
      (i) computing C1 parity bytes;
      (ii) performing a data code conversion;
      (iii) generating track format data including automatic track finding signals, margins, IBGs, preambles, sub data; and
   (h) determining if a proper operation was completed on a frame of data at the end of the frame with the processor, and if proper, writing the next data frame from the beginning of the generation of system data with the formatter under the instruction control of the processor.

17. The method of claim 16 wherein the transferring of the data group responsive to instruction control step comprises the steps of:
   initializing a DMA controller and a main data buffer manager and moving one frame of data from the main data buffer to the formatter through the main data buffer manager;
   randomizing each byte of the data;
   computing a running track checksum of transferred bytes of the data;
   interleaving each bytes of the data; and
   storing each byte of the data in the frame buffer.

18. The method of claim 17 wherein said randomizing step is performed in parallel.

19. The method of claim 17 wherein said randomizing step is performed on the fly before that data is written to frame buffer.

20. The method of claim 17 wherein said running track checksum step is computed on the fly before that data is written to said frame buffer.

21. The method of claim 17 wherein said interleaving step is performed on the fly before that data is written to the frame buffer.

22. The method of claim 17 wherein said C1 parity byte computation step is performed on the fly before that data is written to magnetic tape.

23. The method of claim 17 wherein said data code conversion step is performed on the fly as frames are transferred between said frame buffer and magnetic tape.

24. The method of claim 17 wherein said data code conversion step is 8–10 GCR encoding and decoding.

25. The method of claim 17 wherein track format data is generated in said generating track format data step in synchronization with signals from a head drum in said digital storage magnetic tape system.

26. The method of claim 17 wherein the data is randomized compatible with the DDS standard.

27. The method of claim 17 wherein the data is interleaved compatible with the DDS standard.

28. In a digital data storage magnetic tape system for storing data from a host device to magnetic tape having a head drum, a main data buffer coupled to a main data buffer manager coupled to a host device interface, a formatter including a direct memory access controller, the formatter coupled to a frame buffer, and a processor coupled to the main data buffer manager and the formatter, a method of formatting data for accessing and encoding and decoding the data to and from magnetic tape, the data being organized into blocks and including system area data and track format data comprising the operational steps of:
   (a) transmitting synchronized serial data and clock pulses to the formatter;
   (b) deserializing the serial data to parallel,
   (c) computing C1 syndromes from the data;
   (d) buffer managing including branching on C1 syndrome value being no read errors for zero value and read errors for non-zero value;
   (e) storing pointers to block with non-zero syndrome values;
   (f) writing both the data and the syndromes into the frame buffer, thereby constituting a read;
   (g) reading a complete frame and thereafter reading the non-zero C1 syndrome block pointers for error correction;
   (h) generating C2 syndromes and pausing when a non-zero syndrome is generated, thereby performing error correction;
   (i) assembling a frame of data into the frame buffer and correcting all C1 and C2 errors, thereafter moving the data into the main data buffer; and
   (j) moving the data to the host device interface for communication with the host device.

29. The method of claim 28 wherein said C1 syndrome computation step (c) is performed on the fly for main data and sub data as data is moved to and from the tape.

30. In a processor having an address space, an interrupt register having an address space enable bit and a code bit, and a signal pin for signalling when an instruction byte is fetched, a method of increasing the address space comprising the steps of:
   creating a first address space utilizing the signal pin and the addressing modes of the address space enable and code bits to designate said first address space; and creating a second address space utilizing the signal pin and the addressing modes the address space enable and code bits to designate said second address space.

31. The method of claim 30 wherein addresses are decoded into said first (CODE) and second (DATA) decoded address spaces as:

| Address Space Enable bit | Code bit | Signal pin | Decoded Space |
|---|---|---|---|
| 0 | X | 0 | DATA |
| 0 | X | 1 | CODE |
| 1 | 0 | X | DATA |
| 1 | 1 | X | CODE. |

32. The method of claim 31 further comprising the step of writing to CODE space to support flash EPROM.

33. The method of claim 31 further comprising the step of executing from DATA space to support diagnostic firmware routines.

34. The method of claim 30 wherein said processor is an 80C198 microprocessor.

35. A formatter for a digital data storage tape system that encodes and decodes data comprising:

an interface to a processing unit, said interface coupled to a processor bus;

a sequencer, said sequencer coupled to said processor bus and to a read/write channel; and a buffer manager coupled to said interface and to said sequencer by an read/write bus.

36. The formatter of claim 35 wherein said interface comprises an address map decoder, ready logic, interrupt control, serial port handshake logic, and a plurality of registers including an interrupt, a serial port address/status, a serial port data, a Galois field value 1, a Galois field value 2, a Galois field result, a Galois square root and a jumper input.

37. The formatter of claim 35 wherein said sequencer comprises a C1 parity generator, a C1 syndrome generator, a read/write sequencer, an encoder/decoder, an track finding pattern generator, an ID parity and a plurality of registers including a serial/deserializer control 0, a serial/deserializer control 1, a status, two read track checksum, and a bit pointer, a state counter, a block counter and a byte counter.

38. The formatter of claim 35 wherein said buffer manager comprises a C2 parity generator, a C2 syndrome generator, a data path control, a buffer address generator, a direct memory access arbitrator, a direct memory access handshake, and a randomizer, and a plurality of registers including a direct memory access controller control, SRAM access latch, two track 1 checksum, two track 2 checksum, an ECC control, a control pulse, a C2 block address and a bad C1 block count.

* * * * *